United States Patent [19]

Francis et al.

[11] Patent Number: 5,761,418
[45] Date of Patent: Jun. 2, 1998

[54] INFORMATION NAVIGATION SYSTEM USING CLUSTERIZED INFORMATION RESOURCE TOPOLOGY

[75] Inventors: Paul Francis; Takashi Kambayashi; Shinya Satou; Susumu Shimizu, all of Tokyo, Japan

[73] Assignee: Nippon Telegraph and Telephone Corp., Tokyo, Japan

[21] Appl. No.: 587,511

[22] Filed: Jan. 17, 1996

[30] Foreign Application Priority Data

Jan. 17, 1995 [JP] Japan .................................. 7-004597

[51] Int. Cl.$^6$ .................................................. G06F 15/16
[52] U.S. Cl. ........................... 395/200.31; 395/200.32
[58] Field of Search .......................... 395/200.03, 200.01, 395/200.31, 200.33, 200.75, 200.47

[56] References Cited

PUBLICATIONS

Udi Manber et al, "GLIMPSE: A Tool to Search Through Entire File Systems", University of Arizona, CS Dept. Tuscan Arizona, Oct. 93 pp. 1–10.

Glimpse Help Pages, http://glimpse.cs.arizona.edu/glimpse-help.html, Jul. 15, 1996 pp. 1–13.

Glimpseserver Help Pages http://donkey.cs.arizona.EDU-g-limpseserverhelp.html, Sep. 11, 1995 pp. 1–2.

Paul Clark et al, "A glimpse", paul@cs.arizona.edu, versions 1.0 though 2.0 Feb. 1994 through Feb. 1995.

Glimpseindex Help Pages udi@cs.arizona.edu, Jul. 15, 1996.

Glimpse Home Page http://glimpse.cs.arizona.edu.

ROBOT FAQ http://science.smsu.edu/robot;faq/robot.html Feb. 1995 pp. 1–10.

Brian Pinkerton, "Finding What People Want: Experiences with the Web Crawler", http://www.ncsa.uiuc.edu/SDG/IT94/Proceedings/Searching/pinkerton/webcrawler.html 1994 pp. 1–10.

Hardy et al, "Harvest User's Manual", University of Colorado at Boulder, Technical Report CU–CS–743–94 Oct. 94, Version 1.0 pp. 1–42.

Michael Schwartz et al, "Applying an Information Gathering Architecture to Netfind . . . ", IEEE ACM Transactions on Networking, vol. 2, No. 5 Oct. 94, pp. 426–439.

Peter Danzig et al, "A Case for Caching File Objects Inside Internetworks", ACM SIGCOMM 93, Sep. 1993, pp. 239–248.

Pakzad et al, "Intelligent Information Management Systems", Proceeding of the ISMM International Conference, Jun. 1–3, 94, pp. 66–71.

Netscape Navigator, Introducing Netscape Navigator 2.0 and Netscape Navigator Gold 2.0.

Lycos™, The Catalog of the Internet, Frequently Asked Questions About Lycos.

Network Working Group, Request for Comments: 1738, T. Berners–Lee, CERN, "Uniform Resource Locators (URL)", pp. 1–25.

(List continued on next page.)

Primary Examiner—Mehmet B. Geckil
Attorney, Agent, or Firm—Banner & Witcoff, Ltd.

[57] ABSTRACT

An information navigation system based on an information resource topology among information resources in which each information resource is associated with at least one term combination and a set of links, where each term combination specifies a set of terms describing each information resource and each link links information resources with matching term combinations, and for every existing term combination, a set of information resources that contain said every existing term combination form a cluster, where a cluster is defined as a set of information resources for which there exists at least one path between every pair of information resources in said set of information resources such that said at least one path contains only information resources from said set of information resources and a path is defined as a series of information resources connected through links. The information navigation functions including gathering, searching, and topology managing can be realized on this the information resource topology.

51 Claims, 18 Drawing Sheets

OTHER PUBLICATIONS

HTTP Working Group, T. Berners–Lee, MIT/LCS, R. Fielding, UC Irvine, H. Frystyk, Oct. 14, 1995, "Hypertext Transfer Protocol—HTTP/1.0", pp. 1–48.

Network Working Group Request for Comments, R. Wright, et al., Informational dated Jun. 1995, entitled Recommendations for an X.500 Production Directory Service, pp. 1–7.

Article entitled "Recent Trends in Hierarchic Document Clustering: A Critical Review" by Peter Willettt, *Information Processing & Management* vol. 24, No. 5, pp. 577–597, 1988, pp. 577–597.

Article entitled "A Network Organization Used for Document Retrieval", by W.B. Croft, R. Wolf and R. Thompson, 1983 ACM 0-89791-107-5/83/006/0178, pp. 178–188.

Article entitled Automatic Structuring and Retrieval of Larg Text Files, by Gerard Salton, James Allan and Chris Buckley, *Communications of the ACM*, Feb. 1994, vol. 37, No. 2, pp. 97–108.

White Pages Requirements Working Group, "How to Interact with a Whois++ Mesh", by P. Falstrom, Mar. 10, 1995.

FIG.2

| resourceEntry 1: | resourcePointer | |
| --- | --- | --- |
| | seqNumber | |
| | termComb11 | |
| | termComb12 | |
| | ... | |
| | termComb1M | |
| | link11: | resourcePointer11 |
| | | computerId11 |
| | | termComb11 |
| | link12: | |
| | ... | |
| | link1L: | |
| resourceEntry 2: | | |
| resourceEntry 3: | | |
| ... | | |
| resourceEntry N: | | |

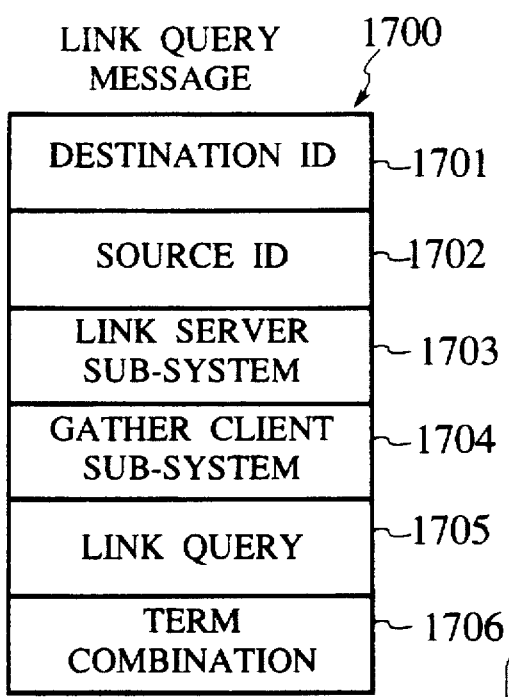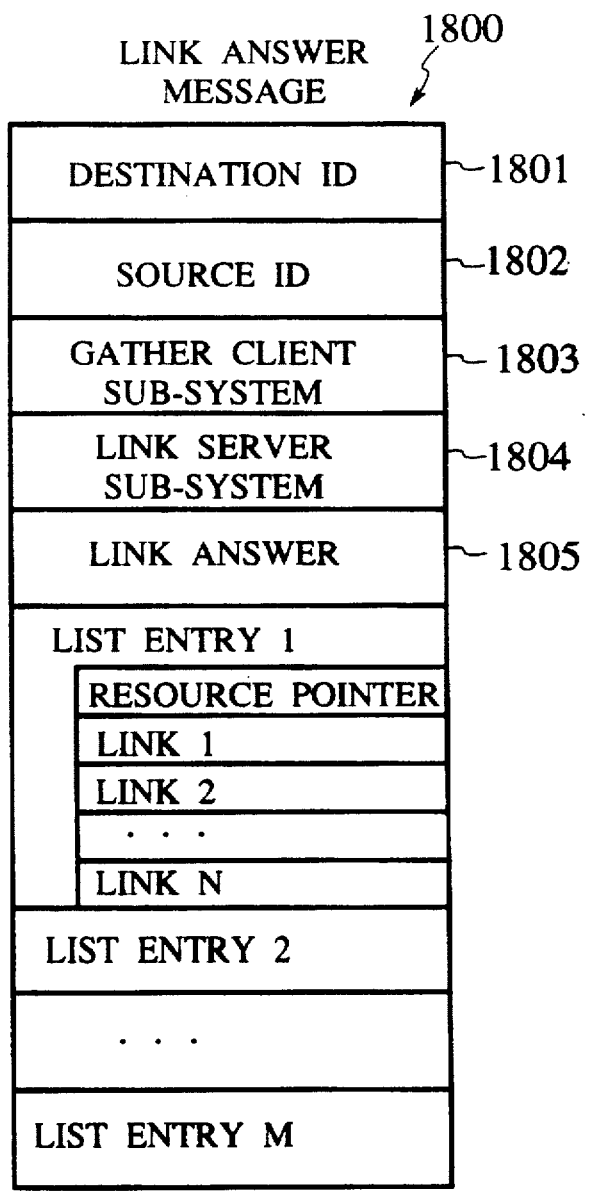

INFORMATION NAVIGATION SYSTEM USING CLUSTERIZED INFORMATION RESOURCE TOPOLOGY

BACKGROUND OF THE INVENTION

1. Field of the Invention

The present invention relates to an information navigation system using a clusterized information resource topology, which will be called Ingrid topology in the following description, which is suitable for Internet Information Resource Discovery and Retrieval.

2. Description of the Background Art

The references listed below will be referred in the following description by a numeral in square brackets assigned at a top of each.

[1] T. Berners-Lee, R. Fiedling, and H. Frystyk: "Hypertext Transfer Protocol-HTTP/1.0" Internet Draft draft-ietf-http-v10-spec-04.html, IETF HTTP Working Group, October 1995.

[2] T. Berners-Lee, L. Masinter, and M. McCahill: "Uniform Resource Locators (URL)", Request For Comments rfc1738.txt, anonymous ftp from ds.internic.net/rfc, December 1994.

[3] "Frequently Asked Questions About Lycos", URL http://lycos.cs.cmu.edu/reference/faq.html, Lycos Inc., 1995.

[4] "Netscape Navigator", URL http://www.mcom.com/, Netscape, 1995.

[5] C. Weider, P. Faltstrom, R. Schoultz: "How to interact with a Whois++mesh", IETF Internet Draft draft-ietf-wnils-whois-mesh-01.txt, anonymous ftp from ds.internic.net/internet-drafts, March 1995.

[6] G. Salton, J. Allan, and C. Buckley: "Automatic Structuring and Retrieval of Large Text Files", Communications of the ACM, 37(2), February, 1994.

[7] R. Thompson, W. Croft, and R. Wolf: "A Network Organization Used for Document Retrieval", Proceedings of the 6th ACM SIGIR Conference, pp. 178–188, June 1983.

[8] P. Willett: "Recent Trends in Hierarchic Document Clustering: A Critical Review", Information Processing and Management, 24(5):577–597, 1988.

[9] R. Wright, A. Getchell, T. Howes, S. Sataluri, P. Yee, and W. Young: "Recommendations for an X.500 Production Directory Service", Request For Comments rfc1803.txt, anonymous ftp from ds.internic.net/rfc, June 1995.

The present invention is relevant to the new and fast growing area of Internet Information Resource Discovery and Retrieval, also known as the Web. The Web can perhaps be best described as a global hypertext application running over the Internet. The Web includes tools for naming and retrieving any Internet Information Resource (also referred hereafter as just resource for short), for authoring hypertext documents that point to those resources (and to other hypertext documents, which are themselves resources), for viewing the hypertext documents, and for searching resource collections.

Two examples of popular Web software tools are:

(1) The World Wide Web (WWW), which includes global resource naming and locating (Uniform Resource Locators, URLs [2]), retrieval (HyperText Transfer Protocol, HTTP [1]), and document authoring (HyperText Markup Language, HTML).

(2) Netscape, which is a hypertext-style, multi-media user interface to the Web [4].

The present invention is also relevant to the field of Information Retrieval (IR). IR is a mature technology area. Many extensive information retrieval services exist, such as the MEDLARS medical library search service in the U.S.A., and JOIS (JICST (Japan Information Center of Science and Technology) Online System) in Japan.

Recently, traditional (centralized) IR and hypertext systems are starting to merge functionally. In addition, IR systems that gather and index Web resources, such as Lycos [3], are now available over the Web. Thus, the three areas of hypertext, IR, and Internet Information Resource Discovery and Retrieval are merging into one. In the following, systems that implement these various technologies will be referred as Information Navigation Systems.

Now, the limitations of the currently available technologies for Web Navigation and IR will be briefly described.

(1) Web Navigation

The major problem with the current Web is the lack of ability to search and browse (collectively called navigate) the information in the Web. Note that searching and browsing are highly related activities. Searching can be described as looking for the resources that fit a particular description, such as a specific set of keywords, while browsing is a less focused "looking around".

Currently, it is impossible to efficiently navigate all of the Web. Parts of the Web can be effectively navigated, for instance by indexing some part of the Web and placing that index on a single computer, which can then be locally searched [3]. But this approach does not scale to global proportions.

The basic problem is that information resources are multi-dimensional. Any given resource will relate to multiple topic areas. The interesting aspects of any given resource will be viewed differently by different people. In order to capture this multi-dimensionality (in the current state-of-the-art), either (1) information must be maintained about individual resources, or (2) information must be maintained about groups of resources, where the information about each group accurately describes the resources that belong to the group.

The amount of information required for the former case will of course not scale to global proportions. Approaches along the lines of the latter case (for instance, categorization hierarchies such as X.500 [9] or centroids [5]) tend either to result in groups that are too general and therefore don't accurately reflect their contents, or in too many overlapping groups, resulting in poor scaling.

Currently there is no serious proposal for how to efficiently navigate all of the Web.

(2) Information Retrieval and Hypertext

IR systems allow a user to search for resources in a large database based on some description of the desired resource, usually keywords. IR systems also allow searching through relevance feedback, by allowing a user to indicate a resource known to be similar to what is desired.

IR has a long history of organizing resources into (usually hierarchical) groupings [7, 8]. This is done both to improve search efficiency (if one relevant resource is found, all of the resources in the same group can be retrieved), and to improve search quality (resources in the group might not match the keyword description but might still be relevant).

Historically, each resource is grouped into a single, or at best, small number of groups. Doing so reduces the amount of memory needed to store the group information. Since information, however, is multi-dimensional, this limited grouping is unlikely to effectively reflect all of the meaningful relations between documents. Indeed, the use of grouping has not been consistently successful, perhaps for this reason [8].

Recently, the use of IR-style groups for improving hypertext navigation has been proposed [6], but many of the same issues exist for this application of groupings as well.

SUMMARY OF THE INVENTION

It is therefore an object of the present invention to provide an information navigation system using a clusterized information resource topology called Ingrid topology which provides the underpinning for a set of techniques that may allow for navigation of the entire global Web.

According to one aspect of the present invention there is provided an information navigation system, comprising: information resources having an information resource topology in which each information resource is associated with at least one term combination and a set of links, where each term combination specifies a set of terms describing each information resource and each link links information resources with matching term combinations, and for every existing term combination, a set of information resources that contain said every existing term combination form a cluster, where a cluster is defined as a set of information resources for which there exists at least one path between every pair of information resources in said set of information resources such that said at least one path contains only information resources from said set of information resources and a path is defined as a series of information resources connected through links; and information navigation means for navigating through the information resource topology.

According to another aspect of the present invention there is provided a method of information navigation through information resources, comprising the steps of: forming an information resource topology among the information resources in which each information resource is associated with at least one term combination and a set of links, where each term combination specifies a set of terms describing each information resource and each link links information resources with matching term combinations, and for every existing term combination, a set of information resources that contain said every existing term combination form a cluster, where a cluster is defined as a set of information resources for which there exists at least one path between every pair of information resources in said set of information resources such that said at least one path contains only information resources from said set of information resources and a path is defined as a series of information resources connected through links; and navigating through the information resource topology.

According to another aspect of the present invention there is provided an article of manufacture, comprising: a computer usable medium having computer readable program code means embodied therein for causing a computer to function as an information navigation system, the computer readable program means including: first computer readable program code means for causing the computer to form an information resource topology among information resources in which each information resource is associated with at least one term combination and a set of links, where each term combination specifies a set of terms describing each information resource and each link links information resources with matching term combinations, and for every existing term combination, a set of information resources that contain said every existing term combination form a cluster, where a cluster is defined as a set of information resources for which there exists at least one path between every pair of information resources in said set of information resources such that said at least one path contains only information resources from said set of information resources and a path is defined as a series of information resources connected through links; and second computer readable program code means for causing the computer to navigate through the information resource topology.

According to another aspect of the present invention there is provided an article of manufacture, comprising: a computer usable medium having computer readable program code means embodied therein for causing a computer to function as an information navigation system for navigating through an information resource topology among information resources in which each information resource is associated with at least one term combination and a set of links, where each term combination specifies a set of terms describing each information resource and each link links information resources with matching term combinations, and for every existing term combination, a set of information resources that contain said every existing term combination form a cluster, where a cluster is defined as a set of information resources for which there exists at least one path between every pair of information resources in said set of information resources such that said at least one path contains only information resources from said set of information resources and a path is defined as a series of information resources connected through links, the computer readable program means including: first computer readable program code means for causing the computer to function as a link server for storing term combinations and links of the information resources, and answering queries about the stored term combinations by listing the links and the information resources associated with those stored term combinations that fully match queried term combinations, so as to realize a gathering function to gather all information resources that contain a given term combination when at least one information resource containing said given term combination is known, by successively traversing the links from said at least one information resource containing said given term combination; second computer readable program code means for causing the computer to function as a search server for storing term combinations and links of the information resources, and answering queries about the stored term combinations by listing the links and the information resources associated with those stored term combinations that partially match queried term combinations, so as to realize a searching function to search at least one information resource that contains a given term combination by successively searching clusters with an increasing number of terms matching with said given term combination; and third computer readable program code means for causing the computer to function as a topology manager to manage the information resource topology.

According to another aspect of the present invention there is provided an article of manufacture, comprising: a computer usable medium having computer readable program code means embodied therein for causing a computer to function as an information navigation system for navigating through an information resource topology among information resources in which each information resource is associated with at least one term combination and a set of links, where each term combination specifies a set of terms describing each information resource and each link links information resources with matching term combinations, and for every existing term combination, a set of information resources that contain said every existing term combination form a cluster, where a cluster is defined as a set of information resources for which there exists at least one path between every pair of information resources in said set of information resources such that said at least one path contains only information resources from said set of information resources and a path is defined as a series of information resources connected through links, the computer readable program means including: first computer readable program code means for causing the computer to function as a gather client for sending queries about a term combination to one link server, and thereby learning fully matching information resources and additional relevant link servers, so as to realize a gathering function to gather all information resources that contain a given term combination when at least one information resource containing said given term combination is known, by successively traversing the links from said at least one information resource containing said given term combination; and second computer readable program code means for causing the computer to function as a search client for sending queries about a given term combination to one search server, and thereby learning partially matching information resources and additional relevant search servers, so as to realize a searching function to search at least one information resource that contains said given term combination by successively searching clusters with an increasing number of terms matching with said given term combination.

Other features and advantages of the present invention will become apparent from the following description taken in conjunction with the accompanying drawings.

BRIEF DESCRIPTION OF THE DRAWINGS

FIG. 2 is a diagram showing an example of a resource entry table in the information navigation system according to the present invention.

FIG. 17 is a diagram showing an example of a link query message used in the information navigation system according to the present invention.

FIG. 18 is a diagram showing an example of a link answer message used in the information navigation system according to the present invention.

DETAILED DESCRIPTION OF THE PREFERRED EMBODIMENTS

Now, the preferred embodiments of the information navigation system according to the present invention will be described in detail with references to the drawings.

1. Overview of the Invention

In the following, an information navigation system according to the present invention will be referred to as Ingrid. There are four major components of Ingrid. They are:

1. The Ingrid topology, which defines the organizational structure of resources.

2. Gathering, which defines how to retrieve all desired resources from the Ingrid Topology once at least one such resource is known.

3. Searching, which defines how to find at least one desired resource.

4. Distributed topology creation and maintenance.

These features of Ingrid will be briefly outlined in this section, and described in greater detail in the following sections.

Ingrid Topology

Briefly stated, Ingrid allows resources to be placed in multiple (perhaps hundreds of) overlapping groups without requiring that any system maintain explicit information about the multiple groups. This allows resources to be distributed across multiple computer systems and searched using any combination of terms without requiring excessive memory in any given computer system.

Ingrid does this by organizing the resources in each overlapping group into a sparsely-connected mesh network.

This network has the special property that every group is a topologically connected subgraph (called a cluster) in the network.

Figure 1:
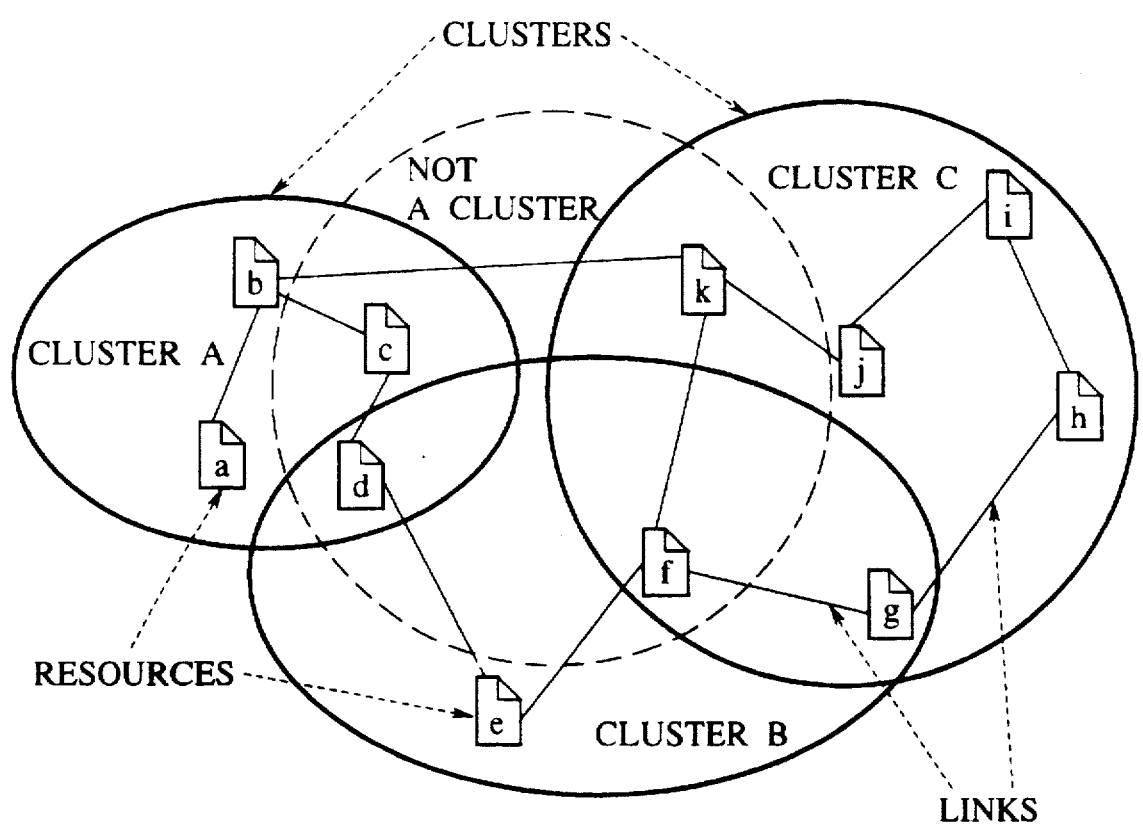
FIG. 1 is a diagram showing an example of resources, links and clusters in the information navigation system according to the present invention.

For instance, consider an example shown In FIG. 1, which shows a number of resources organized into a sparsely-connected mesh network, and some of the clusters (A, B, and C) latent in that network organization. Each of the clusters is topologically connected in that a path exists from any resource in the cluster to any other resource without leaving the cluster. FIG. 1 also shows that the clusters can overlap (or, conversely, that a resource can belong to multiple clusters). For instance, resource f belongs to both clusters B and C.

The clusters are said to be "latent" in the network organization because no system needs to know the membership of the clusters. Instead, associated with each resource is a set of terms that describe the resource (for instance, author, title, and keywords). If one resource with the desired set of terms is known to a searcher, then all relevant resources can be efficiently found by simply traversing the links that lead to other resources with those terms.

As a result, the full multi-dimensionality of resources can be captured without having to maintain in any one place explicit information about all resources or all clusters, or even all clusters a given resource belongs to or all resources a given cluster contains.

Gathering

Because of the cluster organization of Ingrid, if a single resource is known that contains the desired terms, all such resources can efficiently be found by simply successively traversing the links within the cluster (that is, those links that contain the desired terms).

Searching

Resources that contain desired terms can be found in the Ingrid topology by successively searching clusters with more and more of the matching terms. Each time an additional matching term is found, the scope of the search is greatly reduced.

Creation and Maintenance

For a new resource to join the Ingrid topology, new links are created between the new resource and one or more resources already in the Ingrid topology. No other links are added or deleted. To find the resources to which links should be added, a search is made for resources with as many as possible of the same terms as those describing the new resource. The new resource adds links to the smallest possible number of found resources such that, for every possible combination of terms in the new resource, it is connected to at least one other resource with those terms (or none, if no such resource exists).

1.1 Requirements for Physical Implementation of Ingrid

Figure 13:
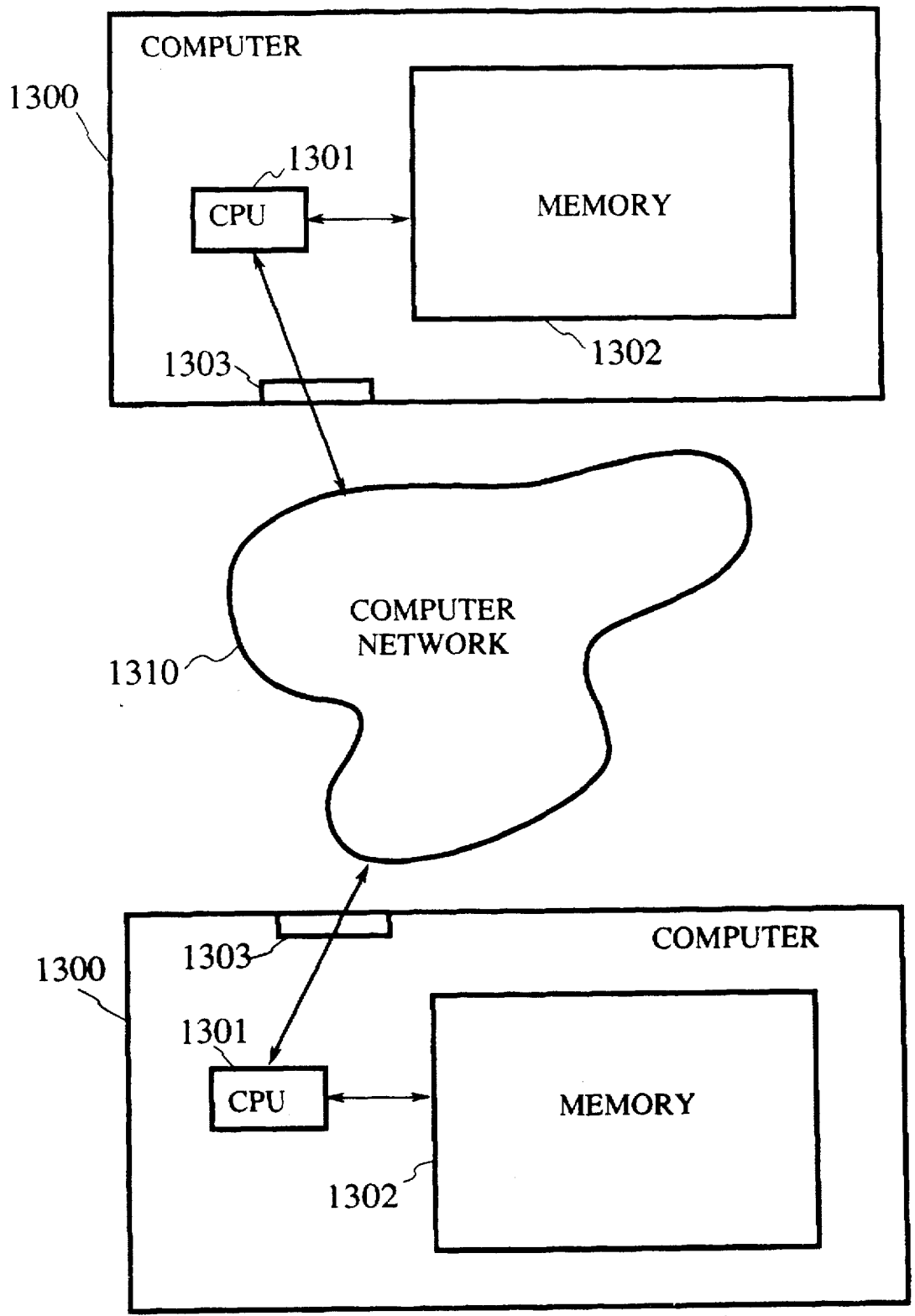
FIG. 13 is a schematic block diagram of an exemplary networked computer systems for implementing the information navigation system according to the present invention.

Ingrid is implemented on networked computer systems. An example of two networked computer systems is shown in FIG. 13, where two computers 1300 are networked through a computer network 1310. Each computer 1300 has a CPU 1301, a memory 1302 readable and writable by the CPU 1301, a communications port 1303 readable and writable by the CPU 1301, and an identifier (not shown).

The communications port 1303 is connected to the computer network 1310 that allows any computer participating in an Ingrid topology to send and receive messages with any other computer participating in the same Ingrid topology.

Figure 14:
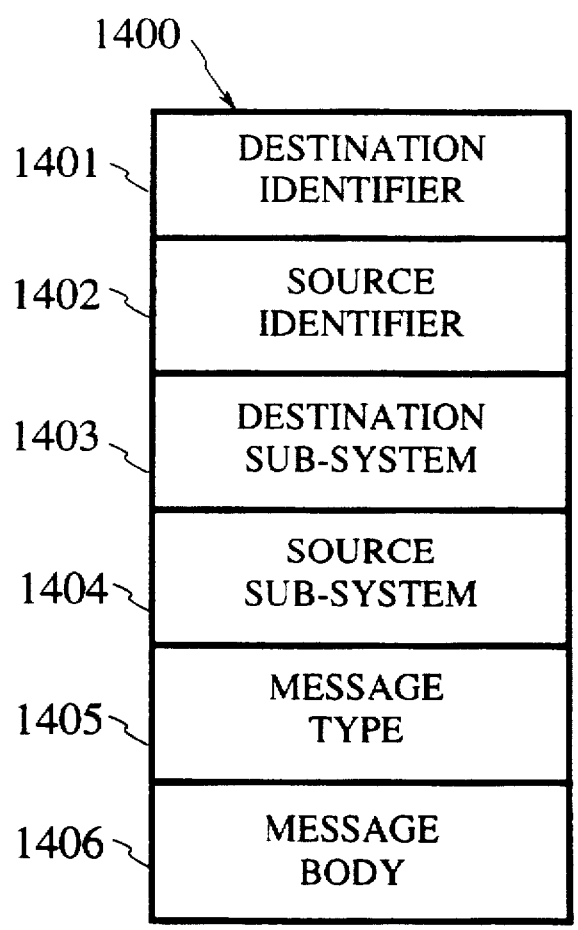
FIG. 14 is a diagram showing an example of a message format used in the information navigation system according to the present invention.

In general, each message is given in a message format 1400 shown in FIG. 14, which contains at least the following information:

1. Destination Identifier 1401. This identifier is used by the computer network to send the message to the identified computer.

2. Source Identifier 1402. This identifier identifies the computer that sent the message.

3. Destination Sub-system 1403. This field indicates which sub-system in the destination computer should process the message.

4. Source Sub-system 1404. This field indicates the sub-system in the source computer that sent the message.

5. Message Type 1405. This field indicates what action should be taken.

6. Message Body 1406. This field contains information relevant to the command.

In general, the networked computer systems contain an ingrid server computer and an ingrid client computer.

Figure 15:
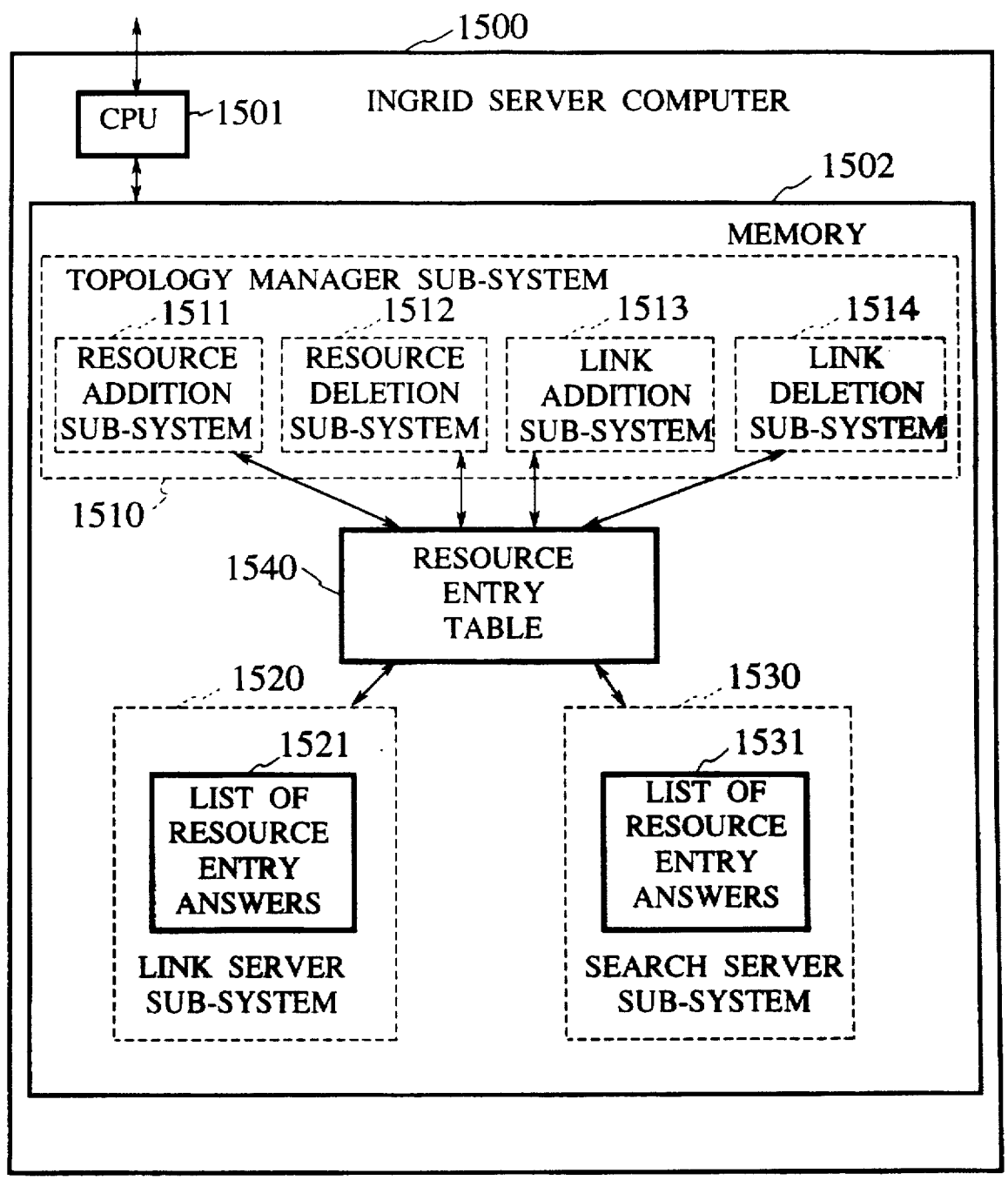
FIG. 15 is a block diagram of an internal configuration of an ingrid server computer constituting the information navigation system according to the present invention.

The ingrid server computer has an internal configuration as shown in FIG. 15, where the ingrid server computer 1500 generally comprises a CPU 1501 and a memory 1502. The memory 1502 has: a topology manager sub-system 1510 containing a resource addition sub-system 1511, a resource deletion sub-system 1512, a link addition sub-system 1513, and a link deletion sub-system 1514; a link server sub-system 1520 containing a list of resource entry answers 1521; a search server sub-system 1530 containing a list of resource entry answers 1531; and a resource entry table 1540 connected with the topology manager sub-system 1510, the link server sub-system 1520, and the search server sub-system 1530.

Figure 16:
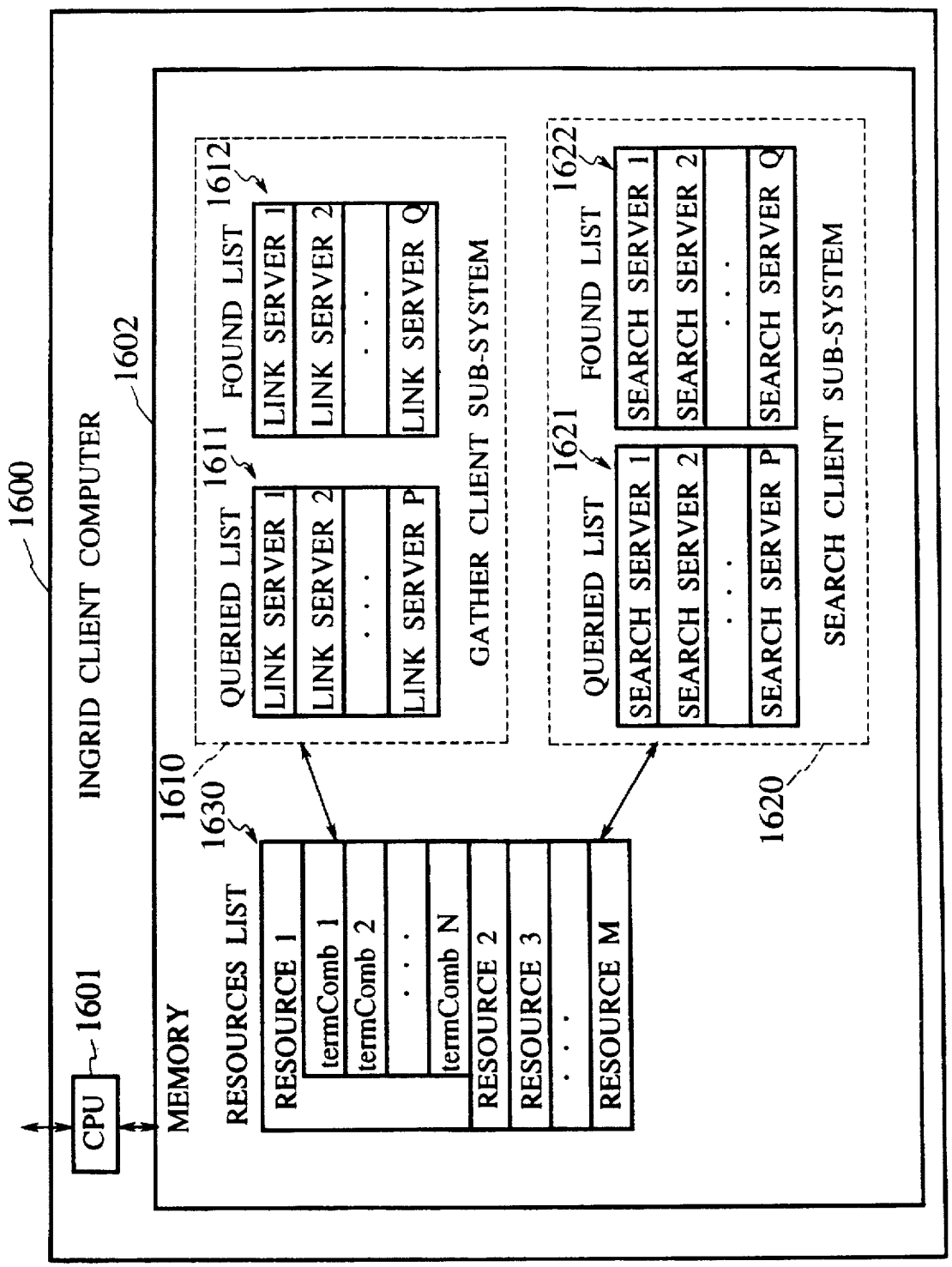
FIG. 16 is a block diagram of an internal configuration of an ingrid client computer constituting the information navigation system according to the present invention.

The ingrid client computer has an internal configuration as shown in FIG. 16, where the ingrid server computer 1600 generally comprises a CPU 1601 and a memory 1602. The memory 1602 has: a gather client sub-system 1610 containing a queried list 1611 and a found list 1612; a search client sub-system 1620 containing a queried list 1621 and a found list 1622; and a resources list 1630 connected with the gather client sub-system 1610 and the search client sub-system 1620.

Each element of these ingrid server computer 1500 of FIG. 15 and ingrid client computer 1600 of FIG. 16 will be described in great detail below.

2. Ingrid Topology Definition

Assume a set of information resources, or just resources. Each resource is described by a set of one or more term combinations, where each term combination is itself a set of terms. A resource R is said to contain a given term combination TC if one of resource R's term combinations is identical to or a superset of the given term combination TC.

Typical examples of terms in a resource's term combination are keywords, title words, and author names. The terms, however, are not limited to these. In particular, it is not necessary that the terms are actually found in the resource itself. Nor is it necessary that the resource itself be text, or even retrievable by a computer. It is only necessary that the Ingrid software know the terms that describe the resource, and has access to a description of how to obtain the resource.

Associated with each resource is a set of zero or more pointers, each pointing to another resource. Each pointer allows for the retrieval of (1) the other resource, (2) the other resource's term combinations, and (3) the other resource's pointers. Thus, one is able to move from resource to resource by following the pointers. Pointers are bidirectional, meaning that if resource A has a pointer to resource B, then resource B also has a pointer to resource A. Such a pair of pointers is called a link.

Define a path as a series of resources $<R_1, R_2, R_3, \ldots, R_n>$ such that there exists links $R_1$–$R_2$, $R_2$–$R_3$, $\ldots$, $R_{n-1}$–$R_n$, where $R_x$–$R_y$ denotes the link between $R_x$ and $R_y$. Define a cluster as a set of resources R for which there exists one or more paths between every pair of resources in R such that the paths contain only resources from set R.

For instance, consider an example shown in FIG. 1 again. FIG. 1 shows a set of resources a through k connected by various links. FIG. 1 also shows three clusters A, B, and C. A is a cluster because there exists a path between each of resources a, b, c, and d that includes only resources a, b, c, and d.

FIG. 1 also gives an example of what isn't a cluster. Resources c, d, f, and k do not form a cluster because, for instance, the only paths between d and f include either b or e, neither of which belong to the set c, d, f, and k.

It is now possible to define the Ingrid topology as follows:

Definition: An Ingrid topology is a topology consisting of resources and their links, whereby for every existing term combination, the set of resources that contain that term combination form a cluster.

Note that, while not explicitly a part of the above definition, it is intended that the clusters are sparsely connected. That is, each member of the cluster will only have a few links to other members of the cluster. This sparseness is one of the factors that contributes to the good scaling characteristics of the Ingrid topology.

It is also intended that the Ingrid topology is embodied across multiple physically-separate networked computer systems, up to and including the case where every resource's term combinations and associated links are stored on a separate physical computer.

Note in particular that a resource does not need to have associated with it any explicit information about what clusters it belongs to, nor does it require such information to exist anywhere. As defined above, each resource has associated with it only its term combinations and its pointers.

This lack of explicit information also contributes to good scaling, especially in the case where there are a large number of resources, each of which contains a large number of terms or term combinations. By good scaling, it is meant that the amount of memory, CPU, or bandwidth required to maintain the Ingrid topology grows much slower than the number of resources, users, computers, and navigations. These two characteristics allow a large amount of information (that is, which resources contain which term combinations) to be (indirectly) encoded with a relatively small number of links. As discussed in detail below, the indirectly encoded information can be efficiently retrieved as needed by traversing the links of the Ingrid topology.

2.1 Approximate Ingrid Topology

In practice, it may be impractical or impossible to create an exact Ingrid topology, i.e., one whereby every cluster contains all of the resources that contain the term combination associated with that cluster. Instead, it may be practical in practice to only approximate an Ingrid topology. That is, some percentage of resources that should belong to a given cluster may in fact not belong.

An approximate Ingrid topology may be nearly as useful as an exact Ingrid topology. This is in part because resource searching is never an exact process even under the best of conditions. For instance, the selection of keywords (by authors, the searching system, or the user) is always inexact. In addition, Ingrid searching software can compensate for the fact that the Ingrid topology itself may not be perfect, as will be described in detail below.

In the following description, unless otherwise stated, any mention of the Ingrid topology is assumed to include the approximate Ingrid topology.

3. Retrieving All Resources that Contain a Given Term Combination

In many cases it is useful to be able to find all (or in the case of an approximate Ingrid topology, most) resources in an Ingrid topology that contain a certain term combination given that at least one such resource is known. An example of this is finding all resources with a given keyword. This function is called gathering.

Given that one resource in an Ingrid topology that contains a given term combination is known, it is possible to retrieve all resources that contain the term combination by following links to nearby resources that contain the term combination until all such resources are visited.

Define the neighbor of a given resource to be all other resources with which the given resource shares a link. The way to gather all resources in a cluster is to successively retrieve neighbor resources and see if they contain the desired term combination. If they do, then the neighbors of that neighbor are retrieved and checked, and so on. All resources that contain the term combination are known to be found when no new neighbors of any found resource contain the term combination.

3.1 Embodiment of the Gathering Function

The physical embodiment of the gathering function requires two different sub-systems. Each sub-system is implemented on a networked computer as described in section 1.1. One sub-system is known as the link server, and is used to (1) store the term combinations and links of resources, and (2) answer queries about those term combinations. This corresponds to the link server sub-system 1520 shown in FIG. 15.

The other sub-system is known as the gather client, which gathers resources by making queries to link servers. This corresponds to the gather client sub-system 1610 shown in FIG. 16.

3.1.1 Embodiment of the Link Server

The link server is embodied in a computer system as described in section 1.1. The memory of the computer system contains a resource entry table of one or more resource entries. Each resource entry contains:

1. A pointer to a resource (which may or may not be stored on the same computer). This pointer uniquely identifies the resource among all resources.

2. The term combinations associated with the resource.

3. The sequence number of the resource. (The sequence number is only used for Ingrid topology creation and maintenance described below.)

4. The links associated with the resource. Each link contains:

(a) The resource pointer of the remote resource.
   (b) The term combination associated with the link. Each link's term combination is a (perhaps proper) subset of one of the resource's term combinations.
   (c) The identifier of the computer containing the resource entry for the remote resource.

An exemplary form of the resource entry table is shown in FIG. 2.

The link server is able to receive a link query message from another computer system (specifically, from a gather client). The link query contains at least the term combination being gathered. More specifically, the link query message is given in a format shown in FIG. 17, where the link query message 1700 includes a destination ID 1701 as the destination identifier, a source ID 1702 as the source identifier, a link server sub-system 1703 as the destination sub-system, a gather client sub-system 1704 as the source sub-system, a link query 1705 as the message type, and a term combination 1706 as the message body.

Upon receiving a link query, the link server sends a link answer message back to the client identified by the link query message. The link answer contains at least a list of resource entry answers. More specifically, the link answer message is given in a format shown in FIG. 18, where the link answer message 1800 includes a destination ID 1801 as the destination identifier, a source ID 1802 as the source identifier, a gather client sub-system 1803 as the destination sub-system, a link server sub-system 1804 as the source sub-system, a link answer 1805 as the message type, and a resource entry answer 1806 as the message body.

The list of resource entry answers contains one entry for every resource entry term combination stored by the link server that fully matches (is identical to or is a superset of) the term combination in the link query. Each resource entry answer contains at least:

1. The resourcePointer of the entry containing the matching term combination.
2. The links associated with the matching term combination.

Figure 3:
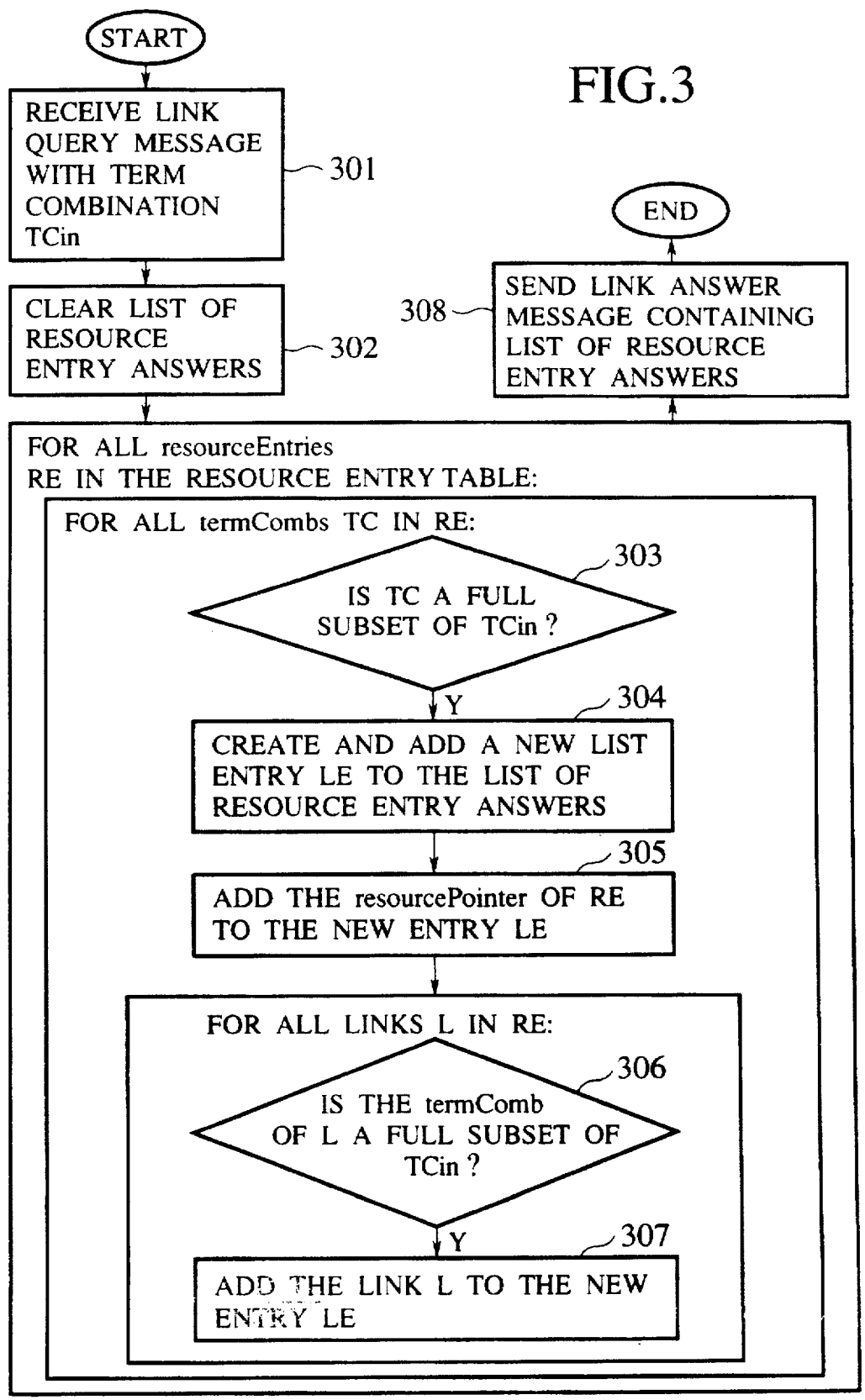
FIG. 3 is a flow chart for an operation of a link server to gather the list of resource entry answers in the information navigation system according to the present invention.

More specifically, the list of resource entry answers is generated according to the flow chart shown in FIG. 3, as follows.

First, a link query message with a term combination TCin is received (step 301), and the list of resource entry answers is cleared (step 302).

Then, for all resourceEntries RE in the resource entry table, and for all termCombs TC in each resource Entry RE, the following steps 303 to 307 are carried out.

Namely, whether each termCombTC is a full subset of the term combination TCin or not is judged (step 303), and if so, a new list entry LE is created and added to the list of resource entry answers (step 304), and the resourcePointer of the resourceEntry RE is added to the new entry LE (step 305).

Then, for all links L in the resourceEntry RE, the following steps 306 and 307 are carried out. Namely, whether the termComb of the link L is a full subset of the term combination TCin or not is judged (step 306), and if so, the link L is added to the new entry LE (step 307).

After these steps 303 to 307 are completed for all termCombs TC in all resourceEntries RE, a link answer message containing the list of resource entry answers so generated is sent to the client identified by the link query message with the term combination TCin (step 308).

Note that, taken by itself, there is nothing novel about the functionality of a single link server. It is similar to the functionality of any search engine. It is the total combined functionality of all link servers spread over multiple networked computers that creates a working Ingrid topology.

3.1.2 Embodiment of the Gather Client

The gather client is embodied in a computer system as described in section 1.1. Initially, the gather client knows of one link server that contains a resource entry that matches the desired term combination. To gather all resources with the term combination, the gather client maintains the following three lists associated with the gathering operation:

1. The found list which contains the link servers not yet queried that are known to contain at least one fully matching resource.
2. The queried list which contains the link servers that have already been queried.
3. The resources list which contains the matching resources.

Figure 4:
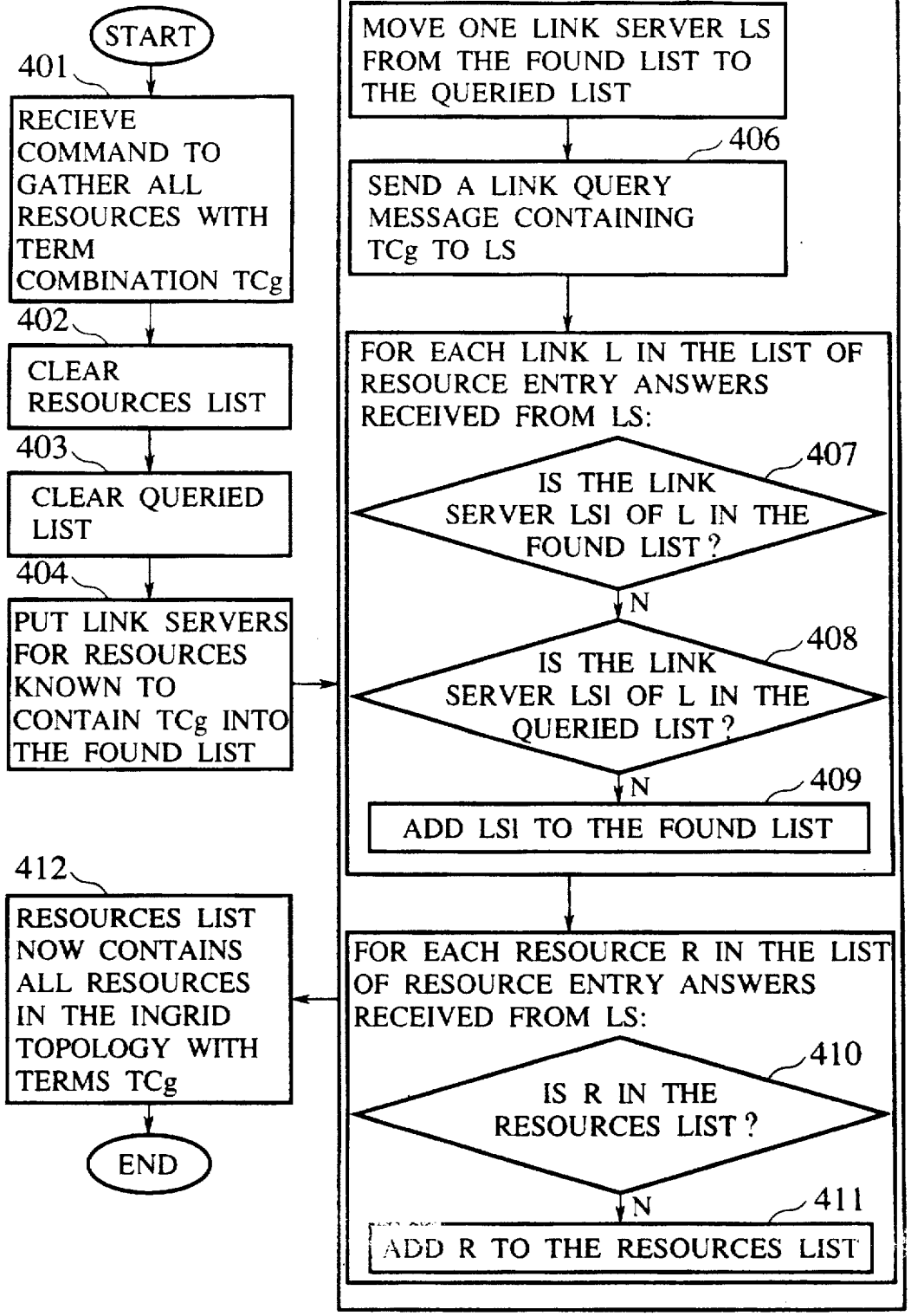
FIG. 4 is a flow chart for an operation of a gather client to gather all resources with a given term combination in the information navigation system according to the present invention.

The operation according to the flow chart shown in FIG. 4 is executed by the gather client, as follows.

First, a command to gather all resources with a term combination TCg is received (step 401), and the resources list is cleared (step 402), while the queried list is also cleared (step 403) and the link servers for resources known to contain the term combination TCg are put into the found list (step 404).

Then, while the found list is not empty, the following steps 405 to 411 are carried out.

Namely, one link server LS is moved from the found list to the queried list (step 405), and a link query message containing the term combination TCg is sent to this link server LS (step 406).

Next, for each link L in the list of resource entry answers received from the link server LS, the following steps 407 to 409 are carried out. Namely, whether the link server LS1 of the link L is in the found list or not is judged (step 407), and if not, whether the link server LS1 of the link L is in the queried list or not is judged (step 408). If not, the link server LS1 is added to the found list (step 409).

Next, for each resource R in the list of resource entry answers received from the link server LS, the following steps 410 and 411 are carried out. Namely, whether the resource R is in the resources list or not is judged (step 410), and if not, the resource R is added to the resources list (step 411).

After these steps 405 to 411 are completed for all the link servers in the found list, the resources list now contains all resources in the Ingrid topology with the term combination TCg (step 412).

Thus, when these steps are completed, all of the resources that contain the desired term combination will be listed in the resources list.

Note that, in this method, a single link query covers all the resources stored in a link server, and therefore can return the links of multiple resources. It is the link server that determines whether or not a given resource contains a given term combination. The gather client is responsible for remembering which link serves have been queried, and for saving the results of queries.

This is a minor modification of the basic approach described above, where the client retrieves the term combinations and links for specific resources, and determines itself whether or not that resource's term combination matches, and therefore whether to retrieve the neighbors of that resource. That approach achieves the same overall functionality, but is less efficient than the method of FIG. 4.

4. Searching the Ingrid Topology

The previous section described how to retrieve the full set of resources with a specified term combination given that one such resource is known. This section describes a technique for how to find at least one resource with a specified term combination. Or, if no resource with the term combination exists, then this technique finds the set of resources that, taken together, contain as many of the term sub-combinations of the specified term combination as possible.

Define a term sub-combination of a given term combination TC as a term combination that contains some or all of the terms of TC. For example, the term sub-combinations of the term combination <ABC> (where A, B, C are separate terms) are: <A>, <B>, <C>, <AB>, <AC>, <BC>, and <ABC>. So, for instance, if the term combination <ABC> is being searched, and no resource contains <ABC>, but three resources contain <AB>, <AC>, and <BC> respectively, then the search technique described here will find all three of these resources.

Note for instance that if an additional resource with term combination <ADE> exists, that term combination will not necessarily be found by the search technique. The reason is that <A> is redundant given the existence of <AB> and <AC>. (And furthermore, <DE> is not relevant to the search, and so is ignored.)

The term combination being searched is referred to as the search terms. In what follows, it is assumed that the searching system initially knows of at least one resource for each of the search terms. For example, if the search terms are <ABC>, the searching system will initially know of at least one resource with <A>, one resource with <B>, and one resource with <C>. (For completeness, a known method of efficiently finding the required initial resources is given in section 4.1.4 below.) Note that when a searching system is said to "know of a resource", the implication is that the searching system also knows what computer contains the resource entry table for that resource.

The basic mechanism used for searching is that of referral. There is a search client that is responsible for managing the search. There are multiple search servers. These search servers contain pointers to resources, their terms, and their links. The search servers also contain the terms of the resources the links point to. If a search server contains a resource with a given term combination, the search server is said to be in the cluster associated with the term combination.

The search client queries some search server with the search terms. The search server refers the search client to other search servers whose resources contain the search terms. This continues either until the desired resource is found or the search client determines that the desired resource does not exist or is too difficult to find.

Figure 5:
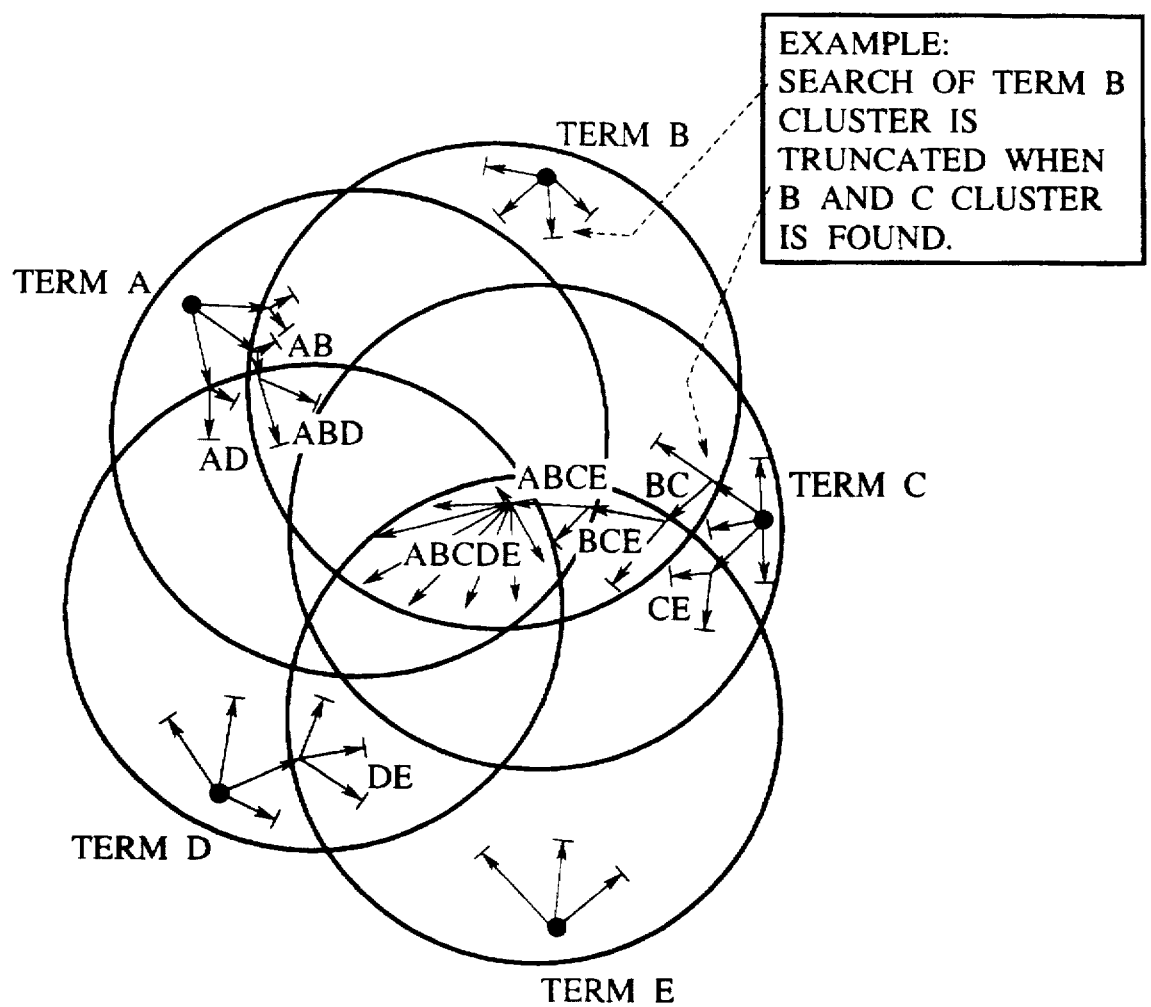
FIG. 5 is a diagram showing an example of a search procedure in the information navigation system according to the present invention.

The basic approach for searching Ingrid is to successively find search servers with more and more matching terms until a search server is found with all the terms. This process is illustrated in FIG. 5, which shows 5 clusters as 5 circles, for terms A, B, C, D, and E. The overlap of the circles represent clusters for term combinations with more than one term.

The search client explores each of the clusters with one term until it finds one or more search servers that contain resources with two matching terms. This searching process is denoted in FIG. 5 by the arrows. The search client is shown finding clusters for term combinations <AB>, <AD>, <BC>, <CE>, and <DE>. At this point, any continued searching of clusters with one term is (perhaps temporarily) discontinued (as indicated by the solid line across the arrow tip). This is because searching a cluster with two terms is, in most cases, more likely to yield good results than searching a cluster with one term. (The exception being, for instance, a cluster for a single rare term versus a cluster for two common terms.)

FIG. 5 shows searching branching out within the clusters with two terms until two clusters with three terms are found, <ABD> and <BCE>. Any further searching of clusters with two terms is halted, and the clusters with three terms are searched. Next, FIG. 5 shows that a cluster with four terms <ABCE> is found. This cluster is explored until the cluster with all five terms is found. This ends the search.

In the example of FIG. 5, the search was able to continually find better clusters (clusters with more matching terms) until a full match was found. Each time a better cluster was found, exploration of poorer clusters was discontinued. In general, however, it may happen that a better cluster is completely explored without finding still better clusters. In this case, the search client can resume searching of the poorer clusters. This process continues until either some predetermined limits have been exhausted (such as the total number of queries made or the total time spent), or until all possible clusters have been fully explored.

Note also that FIG. 5 depicts a fully correct Ingrid topology. In the case of an approximate Ingrid topology, it may be that a cluster being explored is actually partitioned. In this case, one partition of the cluster may be fully explored without in fact checking all of the resources that contain the term combination of the cluster. If the search client suspects that this is the case (because, for instance, the number of resources in a cluster is smaller than what might be expected), then it may continue searching larger clusters in order to find the other partitions.

If the search client does discover a partitioned cluster, it could, as an optimization, notify the appropriate Ingrid topology creation and maintenance sub-systems, which could in turn repair the partition.

4.1 Embodiment of the Searching Function

Similarly as in a case of the gathering function, the physical embodiment of the searching function requires two different sub-systems, which in this case are the search server corresponding to the search server sub-system 1530 shown in FIG. 15 and the search client corresponding to the search client sub-system 1620 shown in FIG. 16.

4.1.1 Embodiment of the Search Server

Figure 19:
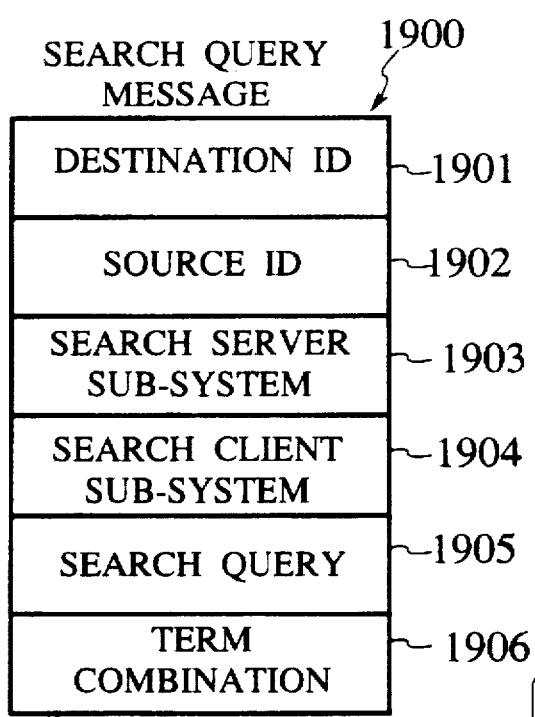
FIG. 19 is a diagram showing an example of a search query message used in the information navigation system according to the present invention.

The search server is similar to the link server of section 3.1.1 in a number of ways. First, the search server and link server share the same resource entry table. Second, the search server is able to receive a query message and return an answer. In the case of the search server, the query message is called the search query. However, the contents of the search query message body are identical to those of the link query. More specifically, the search query message is given in a format shown in FIG. 19, where the search query message 1900 includes a destination ID 1901 as the destination identifier, a source ID 1902 as the source identifier, a search server sub-system 1903 as the destination sub-system, a search client sub-system 1904 as the source sub-system, a search query 1905 as the message type, and a term combination 1906 as the message body.

Figure 20:
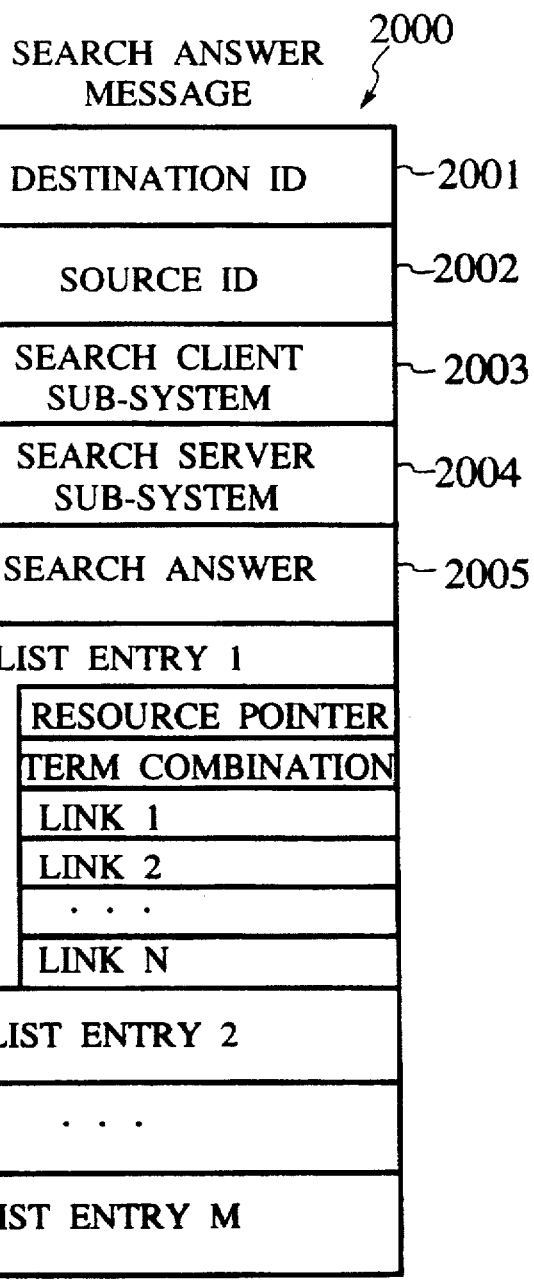
FIG. 20 is a diagram showing an example of a search answer message used in the information navigation system according to the present invention.

The answer returned by the search query is similar to that of the link query in that the answer contains a list of resource entry answers. However, there are two significant differences. First, rather than simply include resources that fully match, the search server returns a list of resources that match fully or partially. In other words, as long as the resource in the memory of the search server matches at least one term, it is returned in the search answer. Second, in addition to including the resourcePointer and list of links in each resource entry answer, the search server also returns the terms that matched. Thus, the search client is able to determine which clusters the resources in the resource entry answer belong to. More specifically, the search answer message is given in a format shown in FIG. 20, where the search answer message 2000 includes a destination ID 2001 as the destination identifier, a source ID 2002 as the source identifier, a search client sub-system 2003 as the destination sub-system, a search server sub-system 2004 as the source sub-system, a search answer 2005 as the message type, and a resource entry answer 2006 as the message body.

Figure 6:
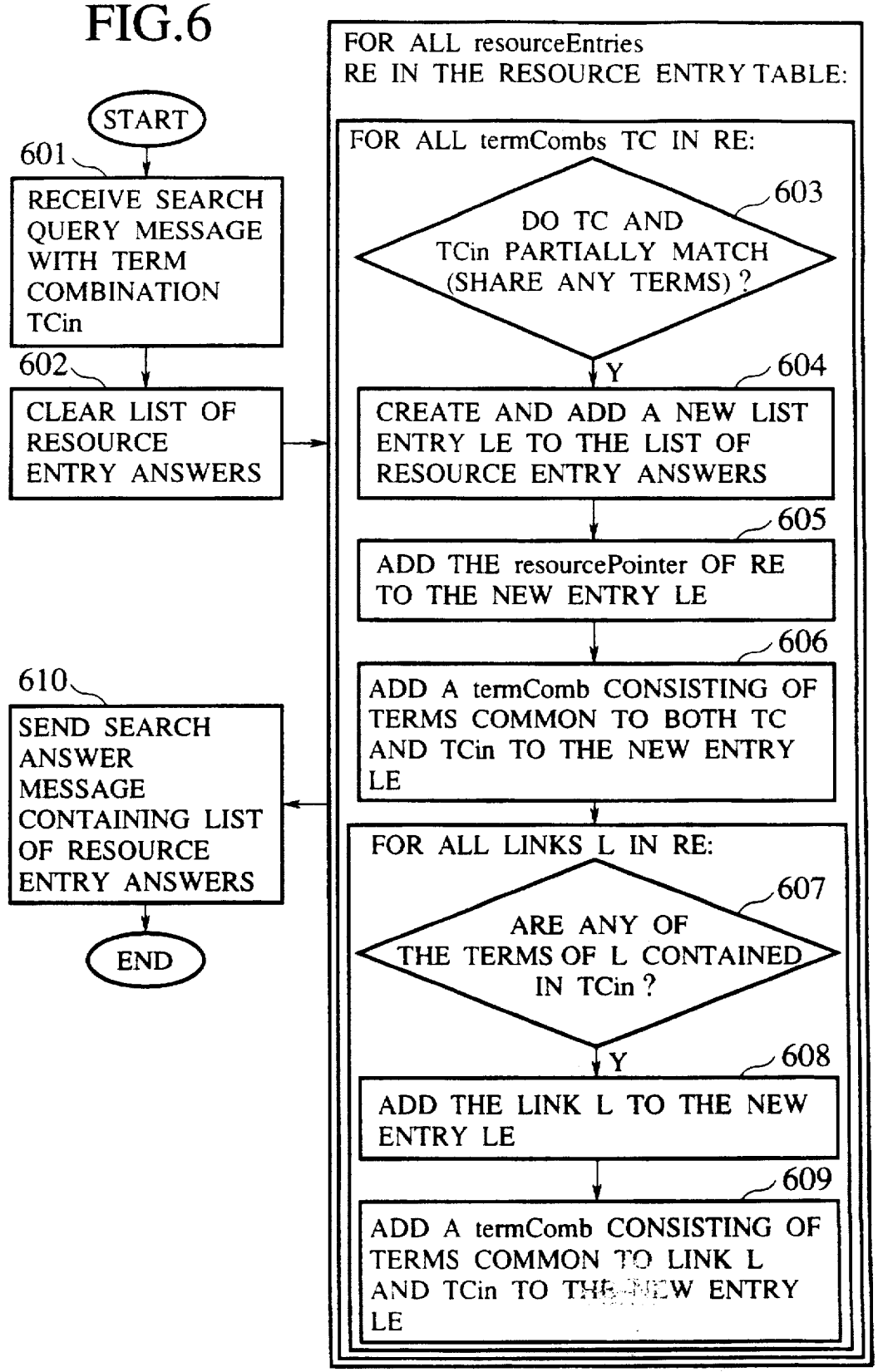
FIG. 6 is a flow chart for an operation of a search server to generate the list of resource entry answers in the information navigation system according to the present invention.

The operation according to the flow chart shown in FIG. 6 is executed by the search server in response to a search query, as follows.

First, a search query message with a term combination TCin is received (step 601), and the list of resource entry answers is cleared (step 602).

Then, for all resourceEntries RE in the resource entry table, and for all termCombs TC in each resource Entry RE, the following steps 603 to 609 are carried out.

Namely, whether each termComb TC and the term combination TCin partially match (i.e., share any terms) or not is judged (step 603), and if so, a new list entry LE is created and added to the list of resource entry answers (step 604), the resourcePointer of the resourceEntry RE is added to the new entry LE (step 605), and a termComb consisting of terms common to both the termComb TC and the term combination TCin is added to the new entry LE (step 606).

Then, for all links L in the resourceEntry RE, the following steps 607 to 609 are carried out. Namely, whether any of the terms of the link L are contained in the term combination TCin or not is judged (step 607), and if so, the link L is added to the new entry LE (step 608), and a termComb consisting of terms common to the link L and the term combination TCin is added to the new entry LE (step 609).

After these steps 603 to 609 are completed for all term-Combs TC in all resourceEntries RE, a search answer message containing the list of resource entry answers so generated is sent to the client identified by the search query message with the term combination TCin (step 610).

Because the differences between the search server and the link server are minor, and particularly because the identical memory table is used in both, the two sub-systems would normally be implemented on the same computer, as in the ingrid server computer 1500 of FIG. 15.

4.1.2 Embodiment of the Search Client

Initially, for each term in the desired term combination, the search client knows of one search server that contains a resource entry that matches that term. Like the gather server of section 3.1.2, the search server maintains three lists during the search process. However, the contents of these lists are somewhat different, reflecting the more complex process of searching as compared to gathering, as follows.

1. The found list contains the search servers that are known to contain at least one partially matching resource, but that have not yet been queried. Associated with each search server in the found list is the best term combination known for that search server. By best term combination it is meant the term combination with the most terms matching that of the desired term combination.

2. The queried list contains the search servers that have already been queried.

3. The resources list contains the found partially matching resources. However, no resources in the resources list may contain a term combination that is a subset of or identical to any other resource in the resources list.

Figure 7:
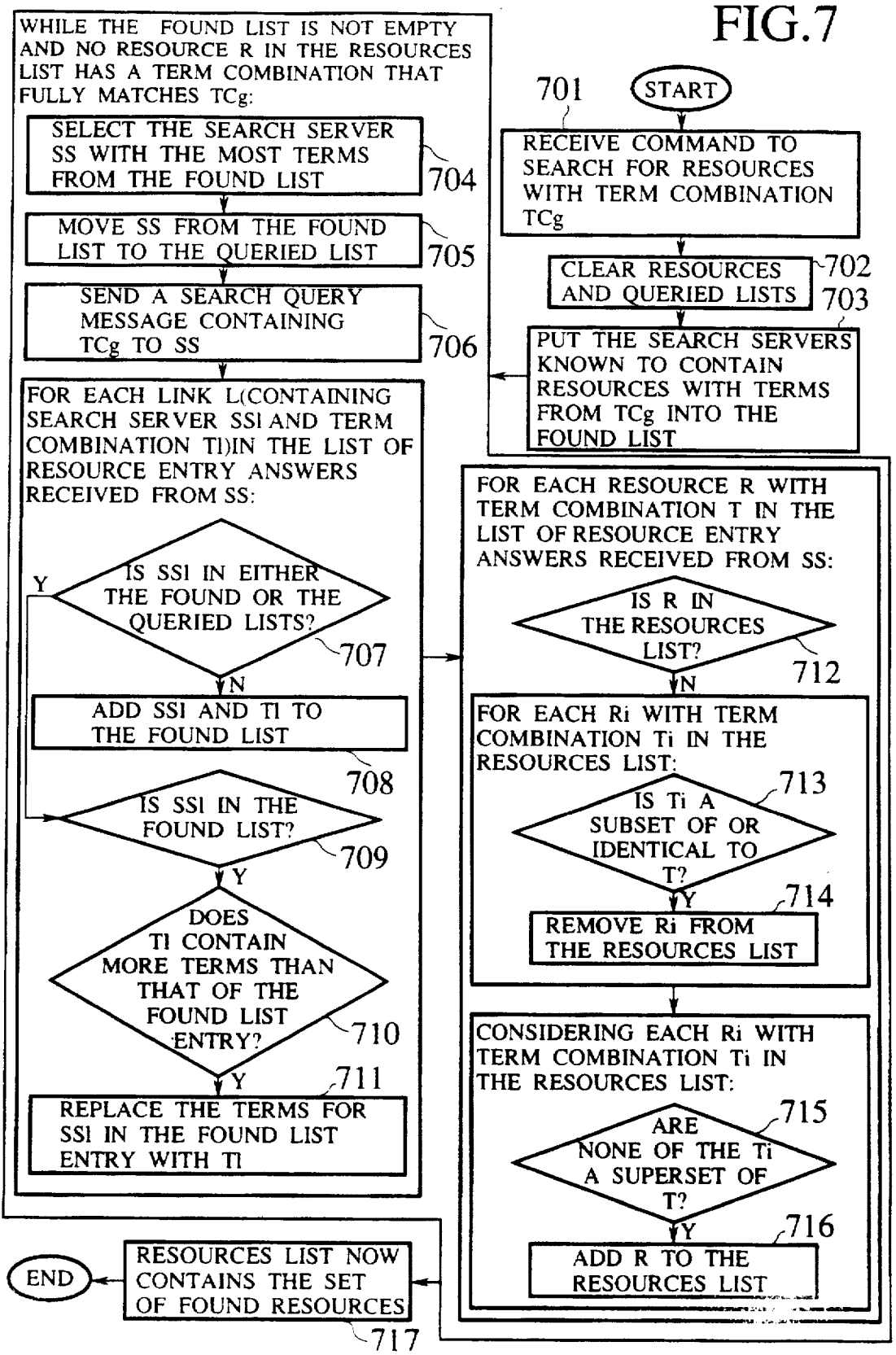
FIG. 7 is a flow chart for an operation of a search client to search for a resource or minimum collection of resources with a given term combination in the information navigation system according to the present invention.

The operation according to the flow chart shown in FIG. 7 is executed by the search client, as follows.

First, a command to search for resources with a term combination TCg is received (step 701), and the resources list and the queried list are cleared (step 702), while the search servers known to contain resources with terms from the term combination TCg are put into the found list (step 703).

Then, while the found list is not empty and no resource R in the resource list has a term combination that fully matches TCg, the following steps 704 to 716 are carried out.

Namely, the search server SS with the most terms is selected from the found list (step 704), and this search server SS is moved from the found list to the queried list (step 705). Then, a search query message containing the term combination TCg is sent to this search server SS (step 706).

Next, for each link L (containing a search server SS1 and a term combination T1) in the list of resource entry answers received from the search server SS, the following steps 707 to 711 are carried out. Namely, whether the search server SS1 of the link L is in either the found list or the queried list, or not, is judged (step 707), and if not, the search server SS1 and the term combination T1 are added to the found list (step 708). Otherwise, whether the search server SS1 of the link L is in the found list or not is judged (step 709), and if so, whether the term combination T1 contains more terms than that of the found list entry or not is judged (step 710). If so, the terms for the search server SS1 in the found list are replaced with the term combination T1 (step 711).

Next, for each resource R with the term combination T in the list of resource entry answers received from the search server SS, the following steps 712 and 716 are carried out. Namely, whether the resource R is in the resources list or not is judged (step 712). If not, for each resource Ri with the term combination Ti in the resources list, the following steps 713 and 714 are carried out. That is, whether the term combination Ti is a subset of or identical to the term combination T, or not, is judged (step 713), and if so, the resource Ri is removed from the resources list (step 714). Then, considering each resource Ri with the term combination Ti in the resources list, the following steps 715 and 716 are carried out. That is, whether none of the term combinations Ti are a superset of the term combination T or not is judged (step 715), and if so, the resource R is added to the resources list (step 716).

After these steps 704 to 716 are completed, the resources list now contains the set of found resources (step 717).

Thus, when these steps are completed, the resources in the resources list represent the set of resources that, taken together, most fully match the various possible term sub-combinations of the desired term combination. In the best case, the resources list will contain only one resource, that is, an exact match with the desired term combination.

Specifically, disregarding all terms not in the search terms, this search finds a set of resources such that:

1. No resource in the resources list has term combinations that are all subsets of those of other resources in the resources list.

2. There are no resources not in the resources list that have term combinations that are not subsets of those in the resources list.

Put another way, for every possible term sub-combination that can be enumerated from the searched term combination, the search will find at least one instance of that term sub-combination if one exists in the Ingrid topology. Further, every resource returned will contain at least one term sub-combination not contained in any other found resource.

4.1.3 Additional Search Mechanisms

It is almost certain that, in practice, search servers will have additional information than that described above for the purpose of answering search queries. This is because, even though the search described here has the desirable effect of continuously narrowing the search scope, it may by itself have inadequate efficiency in many cases. By storing certain additional information, a search server may greatly improve search efficiency.

The most likely method for obtaining additional information is simple caching. For instance, after executing a search, the search client can inform previously queried search servers of the resources found by the search. By saving this information, the search servers can make subsequent similar searches more efficient.

In addition, search clients themselves may use additional information to manage the search process. For instance, in the description here, a search client randomly explores a given cluster in search of a better cluster. Rather than explore randomly, the search client may use additional information to better guide its search. For instance, if the search client knows of synonyms for the search terms, the search client could include the synonyms in its search queries and favor neighbor resources that contain the synonyms.

4.1.4 Finding Resources with a Single Term

The above technique for searching the Ingrid topology requires that at least one cluster is known for each term in the search terms. Strictly speaking, this is not necessary, in the sense that a search client could theoretically randomly search the Ingrid topology from any starting point. However, finding a cluster with even one term using this approach would be prohibitively inefficient.

An efficient method for finding the initial cluster is to use a search database consisting of entries for each individual term in Ingrid space. In other words, each entry is indexable by a single term. Each entry contains one or at most a small number of pointers to search servers that contain resources that contain that individual term. This database can be queried at the beginning of a search to find the initial clusters.

This approach scales well for a number of reasons. First, the database size scales only by the number of terms in Ingrid space (as opposed to the number of term combinations). This number (perhaps several million) is manageable with current technology. Second, the number of queries to each database can be kept adequately small. This is because the database can be replicated so that each database receives only a fraction of the queries. In addition, search clients can save the results of previous searches, and so in many instances will already know of starting clusters at the beginning of a new search.

Techniques for creating and maintaining such a replicated database are well-known.

5. Creating an Ingrid Topology

The previous sections described the Ingrid topology, how to efficiently search the Ingrid topology, and how to efficiently gather resources from the Ingrid topology once at least one appropriate resource has been found. This section describes a technique for creating an Ingrid topology in a fully distributed system. This section completes the necessary components required for a fully functional Ingrid Information Navigation System.

The Ingrid topology is created incrementally. When a new resource is added, no existing links are modified (deleted or attached to different resources). The only new links are those from the new resource to already existing resources. When an existing resource is deleted, only those links between the deleted resource and other resources are deleted. New links may be added, however, to repair any cluster partitions that may have occurred because of the deletion.

To maintain an Ingrid topology, one additional piece of information is associated with every resource. This is a single sequence number.

The basic technique for adding a new resource to the Ingrid topology is to:

1. Execute a search for each term combination in the new resource.
2. Add forward links from the new resource to the resources found.
3. Add backward links from the found resources to the new resource.
4. Set the sequence number of the new resource to be one greater than the highest sequence number of the found resources.

The search executed must be one that returns the same results as that described in section 4. Note that the forward and backward links (elsewhere called pointers) form a single link between two resources.

When links are added to this set of resources, the new resource will be attached to every cluster relevant to the new resource's terms. The new resource, however, will have added a minimum number of links, thus keeping the topology sparse.

Note that a variation on the above scheme allows two or three of each term sub-combination to be found by the search instead of just one. This is a trivial enhancement to the above search technique, whereby the search client gathers one or two additional resources for each cluster in addition to the one found by the search. This variation will result in more robust clusters in the sense that the cluster will be harder to partition. It may also reduce the time required for gathering, as the resulting cluster will have a smaller diameter. However, it results in more links, and therefore greater overhead.

The basic technique for deleting a resource in the Ingrid topology is as follows. Any given resource will potentially have both forward links (those attached to other resources when the resource was added) and backward links (those attached when other resources were added). When a resource is deleted, the resources with backward links to the deleted resource simply delete the links and do nothing else. The resources that had forward links to the deleted resource must re-search in order to re-attach to the clusters that they were partitioned from.

Figure 8:
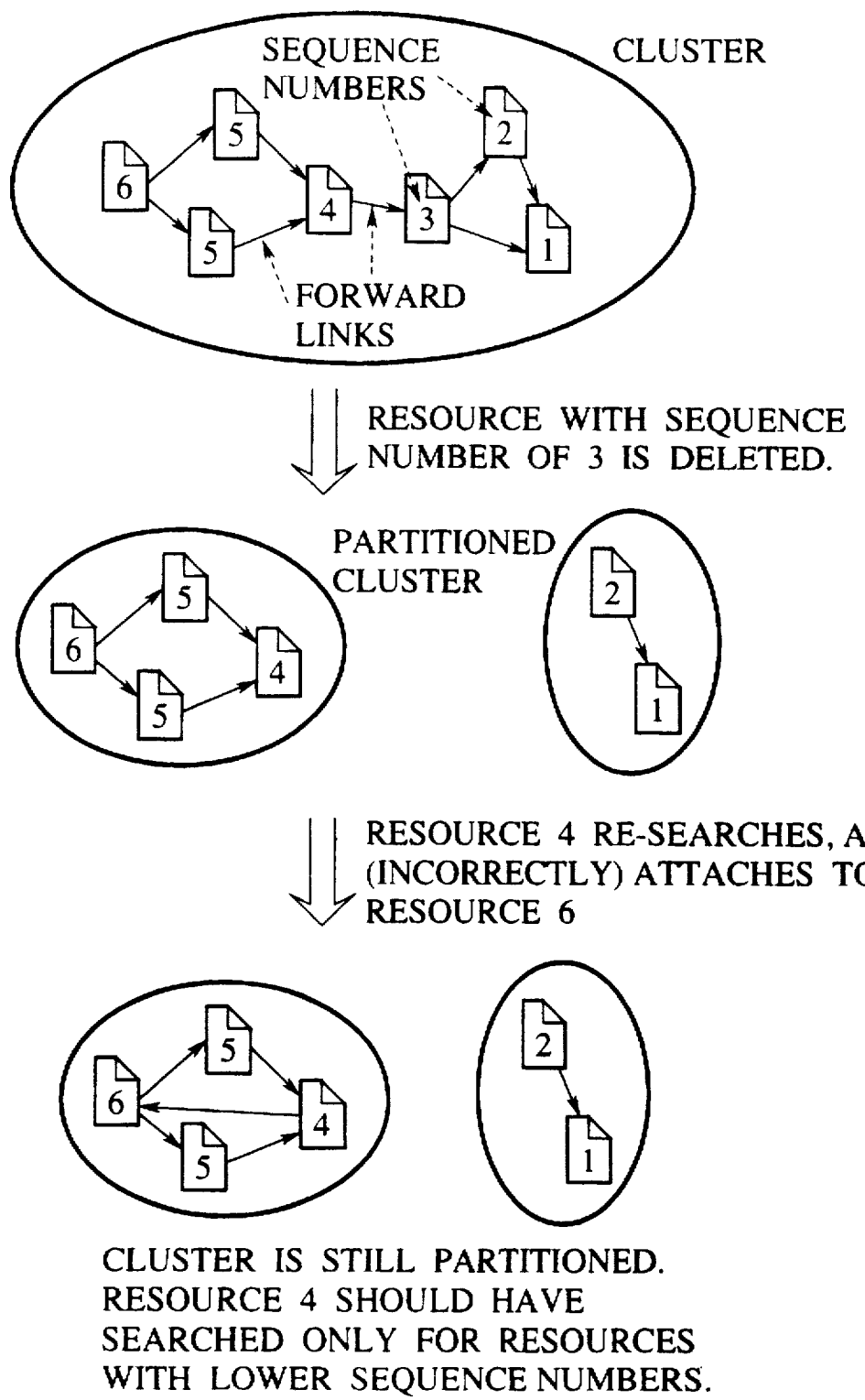
FIG. 8 is a diagram showing an example of incorrect re-attachment at a time of deleting a resource in the information navigation system according to the present invention.

The re-searching must only find resources with lower sequence numbers than that of the deleted resource. This is necessary to insure that the cluster does not remain partitioned after the new links are added. FIG. 8 illustrates an exemplary case in which this is done incorrectly, resulting in a failure to repair the partition produced by a deletion of one resource, which explains why this is necessary.

When a resource is deleted, the cluster it belonged to may be partitioned into two. Of these two partitions, all of the resources in one partition will have sequences lower than that of the deleted resource, and all of the resources in the other partition will have higher sequence numbers.

The resources responsible for repairing the partition are those that formerly had forward links to the deleted resource. Of these, one or more of them will have the lowest sequence number of all those in the higher partition. If these resources re-attach to resources with lower sequence numbers, the partition will be repaired. Otherwise, the partition will remain.

As an optimization to the re-search, before the deleted resource is deleted, it can inform its backward link neighbors of its forward link neighbors. The backward link neighbors can then use the informed forward link neighbors as starting points for the subsequent search, thus making the overall search more efficient.

5.1 Embodiment of Ingrid Topology Creation

Since Ingrid topology creation is done by incrementally adding and deleting resources as described above, the embodiment of the overall Ingrid topology creation process is nothing more than the embodiment of the resource adding and deleting functions.

To embody these resource adding and deleting functions, the following four sub-systems are required:

1. Resource addition sub-system
2. Resource deletion sub-system
3. Link addition sub-system
4. Link deletion sub-system The resource addition and resource deletion sub-systems are executed on the computer that contains the added or deleted resource. The link addition and link deletion sub-systems are executed on the computers that contain the neighbors of the added or deleted resource.

All of these sub-systems operate on the resource entry table. Thus, it is assumed that the four sub-systems operate on the same computer. The four sub-systems are collectively called the topology manager sub-system.

It is also assumed that the topology manager sub-system either (1) runs on the same computers as the link and search servers, or (2) can remotely update the resource entry tables on the link and search servers to reflect any new state.

5.1.1 Embodiment of the Resource Addition Sub-System

The resource addition sub-system initially is given a resource with the following information:
1. A pointer to the resource
2. One or more term combinations For each term combination, the resource addition sub-system executes the same search as the search client, as shown in FIG. 7 described above. The resource addition sub-system then sends a link add message to each of the resources found by the search to add a link. The link add message contains the largest term combination common between the searched term combination and the relevant term combination of the resource found by the search.

Figure 9:
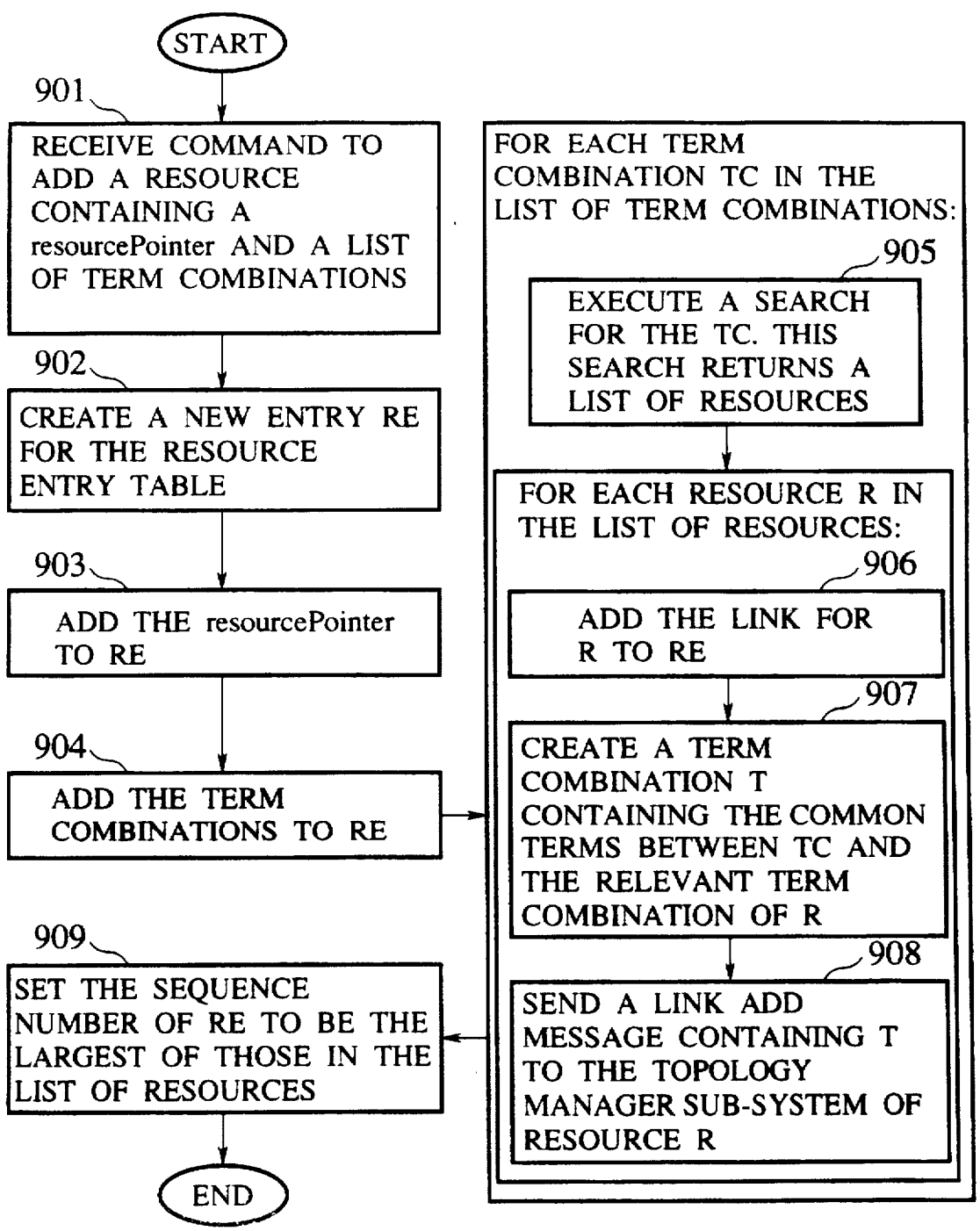
FIG. 9 is a flow chart for an operation of a resource addition sub-system to add a resource to the resource entry table in the information navigation system according to the present invention.

More specifically, this process is realized by the operation according to the flow chart shown in FIG. 9, as follows.

First, a command to add a resource containing a resourcePointer and a list of term combinations is received (step 901), and a new resourceEntry RE for the resource entry table is created (Step 902). Then, the resourcePointer is added to the new resourceEntry RE (step 903), and the term combinations are added to the new resourceEntry RE (step 904).

Then, for each term combination TC in the list of term combinations, the following steps 905 to 908 are carried out. Namely, a search for the term combination TC is executed such that this search returns a list of resources (step 905). Then, for each resource R in the list of resources returned by the search, the following steps 906 to 908 are carried out. That is, the link for the resource R is added to the new resourceEntry RE (step 906), a term combination T containing the common terms between the term combination TC and the relevant term combination of the resource R is created (step 907), and a link add message containing the term combination T is sent to the topology manager sub-system of the resource R (step 908).

After these steps 905 to 908 are completed for all the term combinations in the list of term combinations, the sequence number of the new resourceEntry RE is set to be the largest of those in the list of resources (step 909).

5.1.2 Embodiment of the Resource Deletion Sub-System

The resource deletion sub-system initially is given a resource in its resource entry table to delete. The resource deletion sub-system sends a link delete message to the link deletion sub-systems of each of the links associated with that resource. The link delete message carries the term combination of the resource being deleted and the resource pointers for the resources at either end of the link. The link deletion sub-system then deletes the resource entry from the resource entry table.

Figure 10:
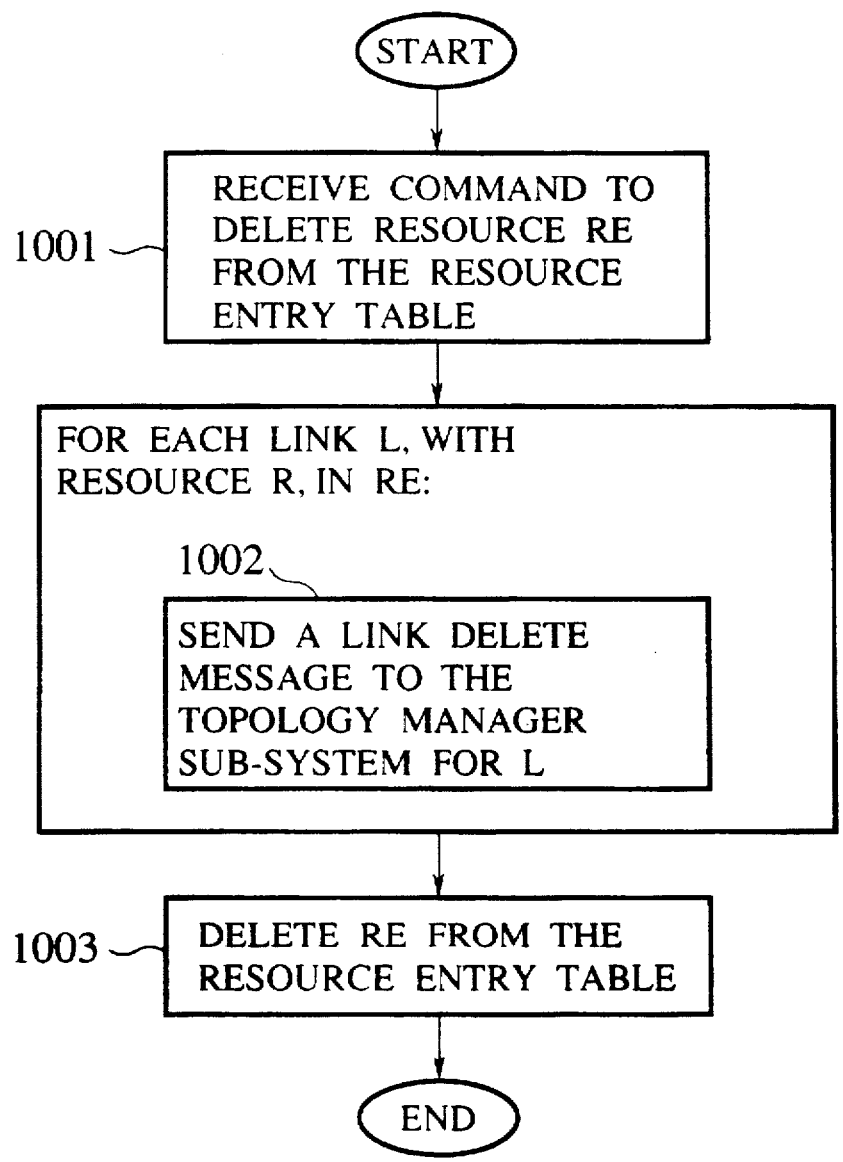
FIG. 10 is a flow chart for an operation of a resource deletion sub-system to delete a resource from the resource entry table in the information navigation system according to the present invention.

More specifically, this process is realized by the operation according to the flow chart shown in FIG. 10, as follows.

First, a command to delete a resourceEntry RE from the resource entry table is received (step 1001). Then, for each link L with the resource R in the resourceEntry RE, a link delete message is sent to the topology manager sub-system for the link L (step 1002).

Then, the resourceEntry RE is deleted from the resource entry table (step 1003).

5.1.3 Embodiment of the Link Addition Sub-System

The link addition sub-system begins execution when it receives a link add message. The link addition sub-system finds the entry in the resource entry table matching the resource information in the received link add message. The link addition sub-system then adds the link to the found entry in the resource entry table.

5.1.4 Embodiment of the Link Deletion Sub-System

The link deletion sub-system begins execution when it receives a link delete message.

If the link specified in the link delete message is for a backward link, the link deletion sub-system simply deletes the entry for the link in the resource entry table.

If the link specified in the link delete message is for a forward link, however, the link deletion sub-system must then execute a search for the terms associated with that link. This search is almost identical to that shown in FIG. 7 described above. The difference is that only those resources with a sequence number lower than that of the resource for which the link was deleted are considered.

Figure 11:
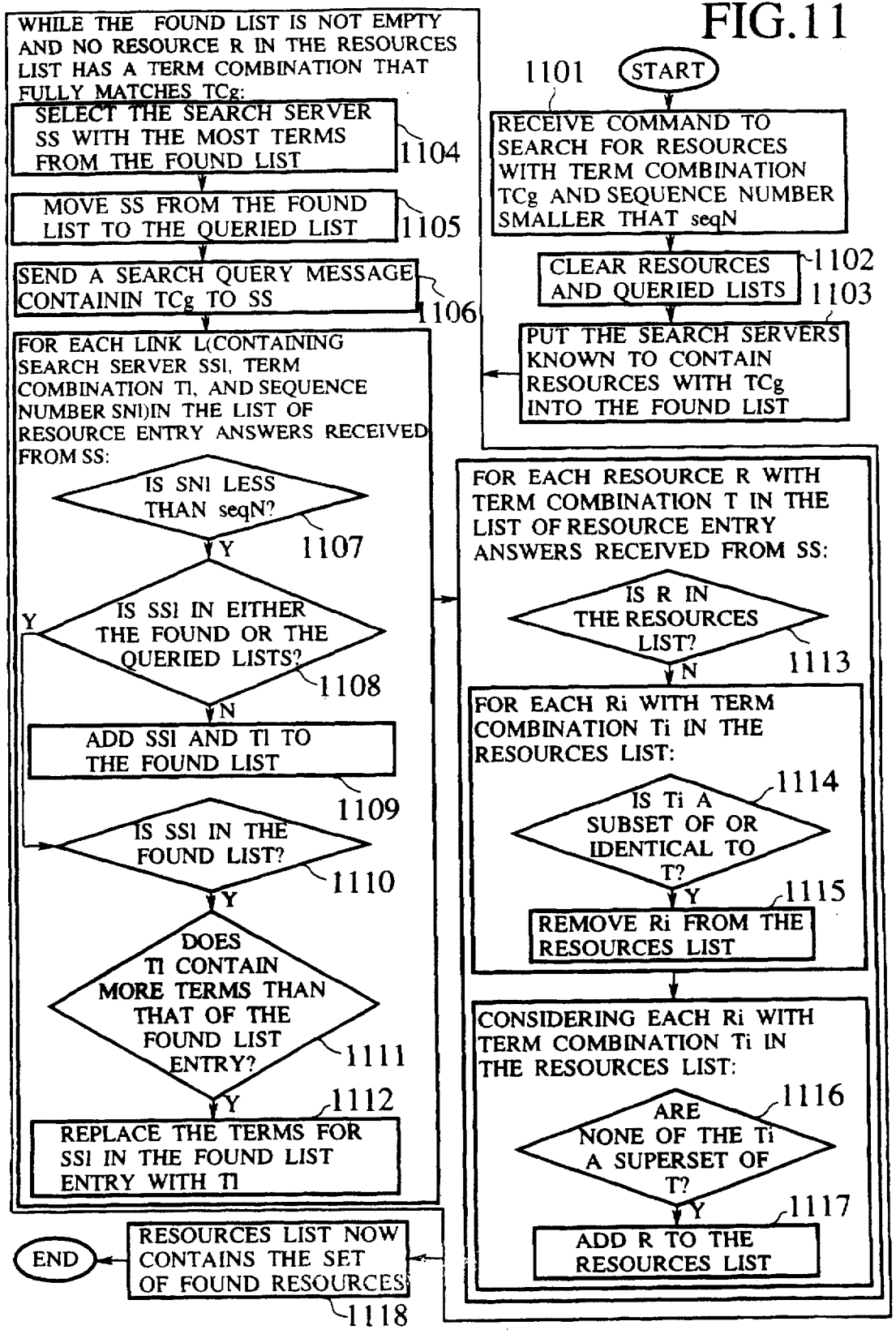
FIG. 11 is a flow chart for an operation of a link deletion sub-system to search for a resource or minimum collection of resources with a given term combination and sequence number threshold in the information navigation system according to the present invention.

More specifically, this modified search is executed according to the flow chart of FIG. 11, as follows.

First, a command to search for resources with a term combination TCg and a sequence number smaller than seqN is received (step 1101), and the resources list and the queried list are cleared (step 1102), while the search servers known to contain resources with the term combination TCg are put into the found list (step 1103).

Then, while the found list is not empty and no resource R in the resource list has a term combination that fully matches TCg, the following steps 1104 to 1117 are carried out.

Namely, the search server SS with the most terms is selected from the found list (step 1104), and this search server SS is moved from the found list to the queried list (step 1105). Then, a search query message containing the term combination TCg is sent to this search server SS (step 1106).

Next, for each link L (containing a search server SS1, a term combination T1, and a sequence number SN1) in the list of resource entry answers received from the search server SS, the following steps 1107 to 1112 are carried out. Namely, whether the sequence number SN1 is less than seqN or not is judged (step 1107). If so, whether the search server SS1 of the link L is in either the found list or the queried list, or not, is judged (step 1108), and if not, the search server SS1 and the term combination T1 are added to the found list (step 1109). Otherwise, whether the search server SS1 of the link L is in the found list or not is judged (step 1110), and if so, whether the term combination T1 contains more terms than that of the found list entry or not is judged (step 1111). If so, the terms for the search server SS1 in the found list entry are replaced with the term combination T1 (step 1112).

Next, for each resource R with the term combination T in the list of resource entry answers received from the search server SS, the following steps 1113 and 1117 are carried out. Namely, whether the resource R is in the resources list or not is judged (step 1113). If not, for each resource Ri with the term combination Ti in the resources list, the following steps 1114 and 1115 are carried out. That is, whether the term combination Ti is a subset of or identical to the term combination T, or not, is judged (step 1114), and if so, the resource Ri is removed from the resources list (step 1115). Then, considering each resource Ri with the terms Ti in the resources list, the following steps 1116 and 1117 are carried out. That is, whether none of the term combinations Ti are a superset of the term combination T or not is judged (step 1116), and if so, the resource R is added to the resources list (step 1117).

After these steps 1104 to 1117 are completed, the resources list now contains the set of found resources (step 1118).

The forward link is then deleted, and any resources found by the modified search are added as new links.

Figure 12:
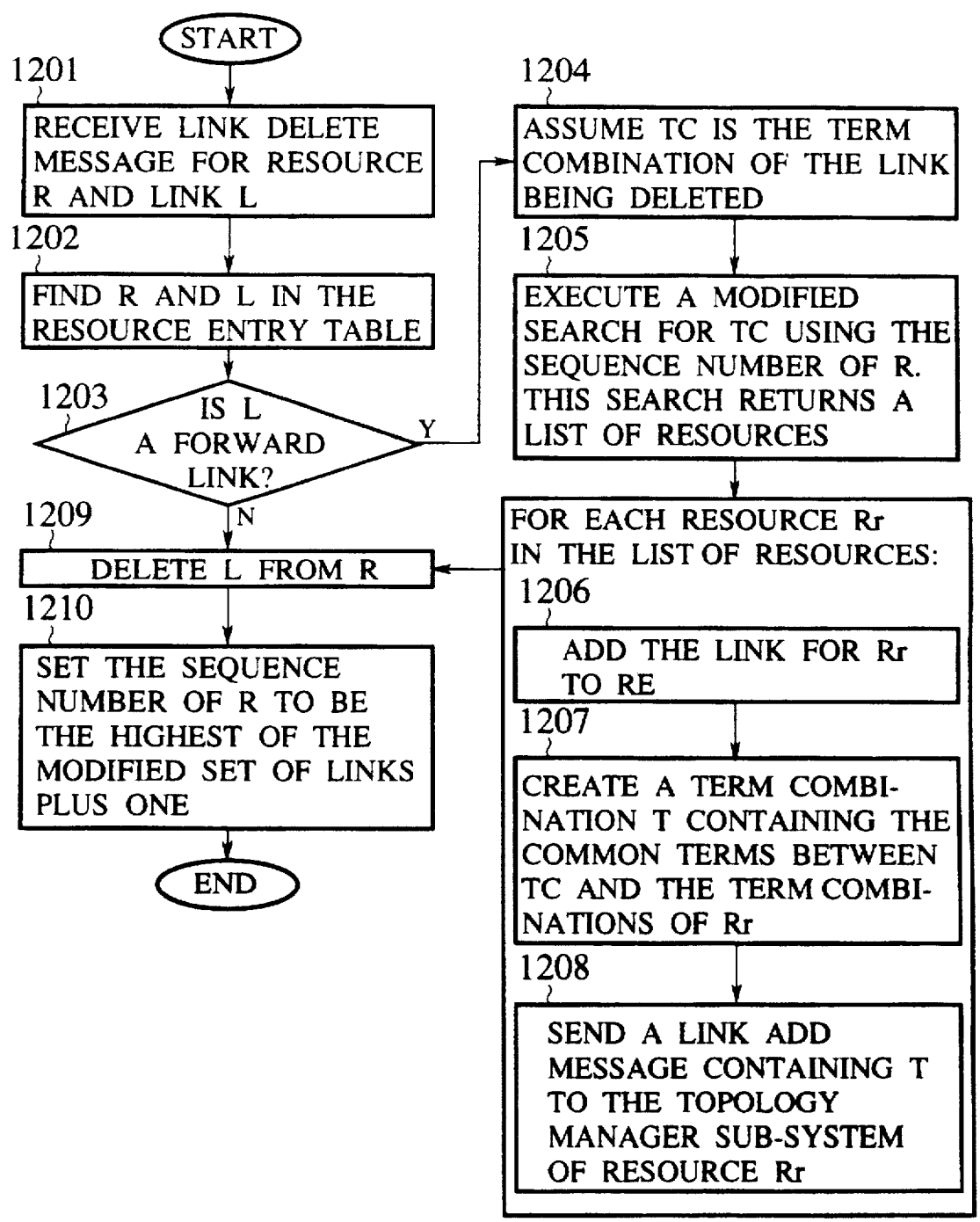
FIG. 12 is a flow chart for an operation of a link deletion sub-system to delete a link from the resource entry table in the information navigation system according to the present invention.

More specifically, this process is realized by the operation according to the flow chart shown in FIG. 12, as follows.

First, a link delete message for a resource R and a link L is received (step 1201), and the resource R and the link L are found in the resource entry table (step 1202). Then, whether the link L is a forward link or not is judged (step 1203). If the link L is the forward link, then the following steps 1204 to 1208 are carried out.

Namely, assuming TC is the term combination of the link being deleted (step 1204), a modified search for the term combination TC using the sequence number of the resource R is executed, such that this modified search returns a list of resources (step 1205). Then, for each resource Rr in the list of resources returned from the modified search, the following steps 1206 to 1208 are carried out. That is, the link for the resource Rr is added to the resourceEntry RE (step 1206), a term combination T containing the common terms between the term combination TC and the term combinations of the resource Rr is created (step 1207), and a link add message containing the term combination T is sent to the topology manager sub-system of the resource Rr (step 1208).

After these steps 1204 to 1208 are completed for the link L which is the forward link, or when the link L is not the forward link, the link L is deleted from the resource R (step 1209), and the sequence number of the resource R is set to be the highest of the modified set of links plus one (step 1210).

6. Software Implementation of the Invention

It is to be noted that the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

For instance, any desired combination of the link server and the gather client of the Ingrid gathering function, the search server and the search client of the Ingrid searching function, and the topology manager sub-system of the Ingrid creation and maintenance function described above can be conveniently implemented into a software package.

In particular, the memory content in the Ingrid server computer shown in FIG. 15 can be conveniently implemented into a software package. This Ingrid server computer of FIG. 15 represents the system that would be used by the provider of an information resource. The provider would presumably have some information resources that could be retrieved by currently available methods such as that using a Netscape Navigator [4], for instance. The information provider would use the resource addition and deletion sub-systems to add/delete each of his resources to/from the Ingrid topology. The link server and search server sub-systems would be used to help Ingrid client systems search for and gather relevant information resources. Note that the resource addition and deletion require the use of the search client sub-system shown in FIG. 16, as described above.

Also, the memory content in the Ingrid client computer shown in FIG. 16 can be conveniently implemented into a software package. This Ingrid client computer of FIG. 16 represents the system that would be used by a searcher of an information resource. This system would presumably be attached to some kind of application software which would provide the interface between the user and Ingrid. Different versions of the application software could vary widely, for instance an application used as a local yellow pages service versus an application used to find scientific papers. However, the basic underlying functionality used for navigating the Ingrid topology by the system of FIG. 16 is the same.

Such a software package can be a computer program product which employs a storage medium including stored computer code which is used to program a computer to perform the disclosed function and process of the present invention. The storage medium may include, but is not limited to, any type of conventional floppy discs, optical discs, CD-ROMs, magneto-optical discs, ROMs, RAMs, EPROMs, EEPROMs, magnetic or optical cards, or any other suitable media for storing electronic instructions.

As should be apparent to those skilled in the art, the information navigation system called Ingrid as described above is particularly effective in realizing (1) a search for desired resources among Internet resources, and (2) topic-based browsing of Internet resources.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A distributed information navigation system, comprising:

information resources which may be stored in different networked computer systems, where said information resources have a distributed information resource topology in which each information resource is associated with at least one term combination and a set of links, where each term combination specifies a set of terms describing each information resource and each link links information resources with matching term combinations, and for every existing term combination, a set of information resources that contain said every existing term combination form a cluster, where a cluster is defined as a set of information resources for which there exists at least one path between every pair of information resources in said set of information resources such that said at least one path contains only information resources from said set of information resources and a path is defined as a series of information resources connected through links; and information navigation means for navigating through the distributed information resource topology.

2. The information navigation system of claim 1, wherein each cluster is sparsely connected.

3. The information navigation system of claim 1, wherein the information navigation means is provided in each one of multiple networked computer systems.

4. The information navigation system of claim 1, wherein the set of terms describing each information resource are given by any of keywords, title words, and author names related to each information resource.

5. The information navigation system of claim 1, wherein the information resource topology is an approximated information resource topology in which not every cluster contains all of the information resources that contain the term combination associated with the information resources belonging to said every cluster.

6. The information navigation system of claim 1, wherein the information navigation means includes gathering means for gathering all information resources that contain a given term combination when at least one information resource containing said given term combination is known, by successively traversing the links from said at least one information resource containing said given term combination.

7. The information navigation system of claim 6, wherein the gathering means includes:
   link servers, each for storing term combinations and links of the information resources, and answering queries about the stored term combinations by listing the links and the information resources associated with those stored term combinations that fully match queried term combinations; and
   a gather client for sending queries about a term combination to one link server, and thereby learning fully matching information resources and any additional relevant link servers which can be subsequently queried.

8. The information navigation system of claim 1, wherein the information navigation means includes searching means for searching at least one information resource that contains a given term combination by successively searching clusters with an increasing number of terms matching with said given term combination.

9. The information navigation system of claim 8, wherein when no information resource with the term combination matching with said given term combination is found, the searching means finds a set of information resources that collectively contain as many of term sub-combinations of said given term combination as possible.

10. The information navigation system of claim 8, wherein the searching means includes:
    search servers, each for storing term combinations and links of the information resources, and answering queries about the stored term combinations by listing the links and the information resources associated with those stored term combinations that partially match queried term combinations; and
    a search client for sending queries about said given term combination to one search server, and thereby learning partially matching information resources and any additional relevant search servers which can be subsequently queried.

11. The information navigation system of claim 1, wherein the information navigation means include topology manager for creating and maintaining the information resource topology.

12. The information navigation system of claim 11, wherein the topology manager includes:
    resource addition means for adding a new information resource to the information resource topology, by searching the information resource topology for information resources with term combinations or sub-combinations that match those of the new information resource and issuing link add messages to matching information resources found by the searching.

13. The information navigation system of claim 12, wherein the topology manager further includes:
    link addition means for adding links from the new information resource to the matching information resources informed by link add messages from the resource addition means.

14. The information navigation system of claim 11, wherein the topology manager includes:
    resource deletion means for deleting an information resource from the information resource topology by issuing link delete messages to those information resources which are linked to the deleted information resource.

15. The information navigation system of claim 14, wherein the topology manager further includes:
    link deletion means for deleting links to the deleted information resource informed by link delete messages from the resource deletion means, by re-searching the information resource topology for information resources with term sub-combinations that match those of the deleted information resource.

16. A method of distributed information navigation through information resources, comprising the steps of:
    forming a distributed information resource topology among the information resources which may be stored in different networked computer systems, in which each information resource is associated with at least one term combination and a set of links, where each term combination specifies a set of terms describing each information resource and each link links information resources with matching term combinations, and for every existing term combination, a set of information resources that contain said every existing term combination form a cluster, where a cluster is defined as a set of information resources for which there exists at least one path between every pair of information resources in said set of information resources such that said at least one path contains only information resources from said set of information resources and a path is defined as a series of information resources connected through links; and navigating through the distributed information resource topology.

17. The method of claim 16, wherein at the forming step, the information resource topology with formed with each cluster sparsely connected.

18. The method of claim 16, wherein the navigating step is carried out in each one of multiple networked computer systems.

19. The method of claim 16, wherein at the forming step, the set of terms describing each information resource are given by any of keywords, title words, and author names related to each information resource.

20. The method of claim 16, wherein at the forming step, the information resource topology is an approximated information resource topology in which not every cluster contains all of the information resources that contain the term combination associated with the information resources belonging to said every cluster.

21. The method of claim 16, wherein the navigating step realizes a gathering function to gather all information resources that contain a given term combination when at least one information resource containing said given term combination is known, by successively traversing the links from said at least one information resource containing said given term combination.

22. The method of claim 21, wherein the navigating step includes the steps of:
    operating link servers, each for storing term combinations and links of the information resources, and answering queries about the stored term combinations by listing the links and the information resources associated with those stored term combinations that fully match queried term combinations; and
    operating a gather client for sending queries about a term combination to one link server, and thereby learning fully matching information resources and any additional relevant link servers which can be subsequently queried.

23. The method of claim 16, wherein the navigating step realizes a searching function to search at least one information resource that contains a given term combination by successively searching clusters with an increasing number of terms matching with said given term combination.

24. The method of claim 23, wherein when no information resource with the term combination matching with said given term combination is found, the searching function finds a set of information resources that collectively contain as many of term sub-combinations of said given term combination as possible.

25. The method of claim 23, wherein the navigating step includes the steps of:

operating search servers, each for storing term combinations and links of the information resources, and answering queries about the stored term combinations by listing the links and the information resources associated with those stored term combinations that partially match queried term combinations; and operating a search client for sending queries about said given term combination to one search server, and thereby learning partially matching information resources and any additional relevant search servers which can be subsequently queried.

26. The method of claim 16, wherein the navigating step realizes a topology managing function to manage the information resource topology.

27. The method of claim 26, wherein the navigating step includes the step of:

operating resource addition means for adding a new information resource to the information resource topology, by searching the information resource topology for information resources with term combinations or sub-combinations that match those of the new information resource and issuing link add messages to matching information resources found by the searching.

28. The method of claim 27, wherein the navigating step further includes the step of:

operating link addition means for adding links from the new information resource to the matching information resources informed by link add messages from the resource addition means.

29. The method of claim 26, wherein the navigating step includes the step of:

operating resource deletion means for deleting an information resource from the information resource topology by issuing link delete messages to those information resources which are linked to the deleted information resource.

30. The method of claim 29, wherein the navigating step further includes the step of:

operating link deletion means for deleting links to the deleted information resource informed by link delete messages from the resource deletion means, by re-searching the information resource topology for information resources with term sub-combinations that match those of the deleted information resource.

31. An article of manufacture, comprising:

a computer usable medium having computer readable program code means embodied therein for causing a computer to function as a distributed information navigation system, the computer readable program means including:

first computer readable program code means for causing the computer to form an information resource topology among information resources which may be stored in different networked computer systems, in which each information resource is associated with at least one term combination and a set of links, where each term combination specifies a set of terms describing each information resource and each link links information resources with matching term combinations, and for every existing term combination, a set of information resources that contain said every existing term combination form a cluster, where a cluster is defined as a set of information resources for which there exists at least one path between every pair of information resources in said set of information resources such that said at least one path contains only information resources from said set of information resources and a path is defined as a series of information resources connected through links; and second computer readable program code means for causing the computer to navigate through the distributed information resource topology.

32. The article of manufacture of claim 31, wherein the first computer readable program code means forms the information resource topology with each cluster sparsely connected.

33. The article of manufacture of claim 31, wherein the second computer readable program code means is operated in each one of multiple networked computer systems.

34. The article of manufacture of claim 31, wherein the first computer readable program code means forms the information resource topology using the set of terms describing each information resource which are given by any of keywords, title words, and author names related to each information resource.

35. The article of manufacture of claim 31, wherein the first computer readable program code means forms the information resource topology as an approximated information resource topology in which not every cluster contains all of the information resources that contain the term combination associated with the information resources belonging to said every cluster.

36. The article of manufacture of claim 31, wherein the second computer readable program code means realizes a gathering function to gather all information resources that contain a given term combination when at least one information resource containing said given term combination is known, by successively traversing the links from said at least one information resource containing said given term combination.

37. The article of manufacture of claim 36, wherein the second computer readable program code means realizes the gathering function by:

operating link servers, each for storing term combinations and links of the information resources, and answering queries about the stored term combinations by listing the links and the information resources associated with those stored term combinations that fully match queried term combinations; and operating a gather client for sending queries about a term combination to one link server, and thereby learning fully matching information resources and any additional relevant link servers which can be subsequently queried.

38. The article of manufacture of claim 31, wherein the second computer readable program code means realizes a searching function to search at least one information resource that contains a given term combination by successively searching clusters with an increasing number of terms matching with said given term combination.

39. The article of manufacture of claim 38, wherein when no information resource with the term combination matching with said given term combination is found, the searching function finds a set of information resources that collectively contain as many of term sub-combinations of said given term combination as possible.

40. The article of manufacture of claim 38, wherein the second computer readable program code means realizes the searching function by:

operating search servers, each for storing term combinations and links of the information resources, and answering queries about the stored term combinations by listing the links and the information resources associated with those stored term combinations that partially match queried term combinations; and operating a search client for sending queries about said given term combination to one search server, and thereby learning partially matching information resources and any additional relevant search servers which can be subsequently queried.

41. The article of manufacture of claim 31, wherein the second computer readable program code means realizes a topology managing function to manage the information resource topology.

42. The article of manufacture of claim 41, wherein the second computer readable program code means realizes the topology managing function by:

operating resource addition means for adding a new information resource to the information resource topology, by searching the information resource topology for information resources with term combinations or sub-combinations that match those of the new information resource and issuing link add messages to matching information resources found by the searching.

43. The article of manufacture of claim 42, wherein the second computer readable program code means realizes the topology managing function by:

operating link addition means for adding links from the new information resource to the matching information resources informed by link add messages from the resource addition means.

44. The article of manufacture of claim 41, wherein the second computer readable program code means realizes the topology managing function by:

operating resource deletion means for deleting an information resource from the information resource topology by issuing link delete messages to those information resources which are linked to the deleted information resource.

45. The article of manufacture of claim 44, wherein the second computer readable program code means realizes the tolopoly managing function by:

operating link deletion means for deleting links to the deleted information resource informed by link delete messages from the resource deletion means, by re-searching the information resource topology for information resources with term sub-combinations that match those of the deleted information resource.

46. An article of manufacture, comprising:

a computer usable medium having computer readable program code means embodied therein for causing a computer to function as a distributed information navigation system for navigating through a distributed information resource topology among information resources which may be stored in different networked computer systems, in which each information resource is associated with at least one term combination and a set of links, where each term combination specifies a set of terms describing each information resource and each link links information resources with matching term combinations, and for every existing term combination, a set of information resources that contain said every existing term combination form a cluster, where a cluster is defined as a set of information resources for which there exists at least one path between every pair of information resources in said set of information resources such that said at least one path contains only information resources from said set of information resources and a path is defined as a series of information resources connected through links, the computer readable program means including:

first computer readable program code means for causing the computer to function as a link server for storing term combinations and links of the information resources, and answering queries about the stored term combinations by listing the links and the information resources associated with those stored term combinations that fully match queried term combinations, so as to realize a gathering function to gather all information resources that contain a given term combination when at least one information resource containing said given term combination is known, by successively traversing the links from said at least one information resource containing said given term combination;

second computer readable program code means for causing the computer to function as a search server for storing term combinations and links of the information resources, and answering queries about the stored term combinations by listing the links and the information resources associated with those stored term combinations that partially match queried term combinations, so as to realize a searching function to search at least one information resource that contains a given term combination by successively searching clusters with an increasing number of terms matching with said given term combination; and third computer readable program code means for causing the computer to function as a topology manager to manage the distributed information resource topology.

47. The article of manufacture of claim 46, wherein the third computer readable program code means realizes the topology manager which includes a resource addition sub-system for adding a new information resource to the information resource topology, by searching the information resource topology for information resources with term combinations or sub-combinations that match those of the new information resource and issuing link add messages to matching information resources found by the searching.

48. The article of manufacture of claim 47, wherein the third computer readable program code means realizes the topology manager which further includes a link addition sub-system for adding links from the new information resource to the matching information resources informed by link add messages from the resource addition sub-system.

49. The article of manufacture of claim 46, wherein the third computer readable program code means realizes the topology manager which includes a resource deletion sub-system for deleting an information resource from the information resource topology by issuing link delete messages to those information resources which are linked to the deleted information resource.

50. The article of manufacture of claim 49, wherein the third computer readable program code means realizes the tolopoly manager which further includes a link deletion sub-system for deleting links to the deleted information resource informed by link delete messages from the resource deletion sub-system, by re-searching the information resource topology for information resources with term sub-combinations that match those of the deleted information resource.

51. An article of manufacture, comprising:

a computer usable medium having computer readable program code means embodied therein for causing a computer to function as a distributed information navigation system for navigating through a distributed information resource topology among information resources which may be stored in different networked compute systems, in which each information resource is associated with at least one term combination and a set of links, where each term combination specifies a set of terms describing each information resource and each link links information resources with matching term combinations, and for every existing term combination, a set of information resources that contain said every existing term combination form a cluster, where a cluster is defined as a set of information resources for which there exists at least one path between every pair of information resources in said set of information resources such that said at least one path contains only information resources from said set of information resources and a path is defined as a series of information resources connected through links, the computer readable program means including:

first computer readable program code means for causing the computer to function as a gather client for sending queries about a term combination to one link server, and thereby learning fully matching information resources and any additional relevant link servers which can be subsequently queried, so as to realize a gathering function to gather all information resources that contain a given term combination when at least one information resource containing said given term combination is known, by successively traversing the links from said at least one information resource containing said given term combination; and second computer readable program code means for causing the computer to function as a search client for sending queries about a given term combination to one search server, and thereby learning partially matching information resources and any additional relevant search servers which can be subsequently queried, so as to realize a searching function to search at least one information resource that contains said given term combination by successively searching clusters with an increasing number of terms matching with said given term combination.

\* \* \* \* \*